(12) United States Patent
Nakamura et al.

(10) Patent No.: US 8,991,939 B2
(45) Date of Patent: Mar. 31, 2015

(54) BRAKE CONTROL DEVICE

(75) Inventors: Eiji Nakamura, Aichi-ken (JP); Akira Sakai, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 13/504,811

(22) PCT Filed: Oct. 28, 2009

(86) PCT No.: PCT/JP2009/005686
§ 371 (c)(1),
(2), (4) Date: Apr. 27, 2012

(87) PCT Pub. No.: WO2011/052007
PCT Pub. Date: May 5, 2011

(65) Prior Publication Data
US 2012/0212044 A1    Aug. 23, 2012

(51) Int. Cl.
*B60T 8/32* (2006.01)
*B60T 8/40* (2006.01)
(Continued)

(52) U.S. Cl.
CPC ............... *B60T 8/4081* (2013.01); *B60T 7/042* (2013.01); *B60T 13/662* (2013.01); *B60T 13/686* (2013.01);
(Continued)

(58) Field of Classification Search
CPC ........... B60T 8/26; B60T 8/348; B60T 8/445; B60T 8/00; B60T 8/1766; B60T 8/94
USPC .................. 303/9.68, 20, 60, 84.2, 191, 122, 303/122.09, 113.4, 119.1, 119.2, 152, 155; 701/70, 83; 180/65.21, 65.265, 65.275
See application file for complete search history.

(56) References Cited

U.S. PATENT DOCUMENTS

| 5,769,509 A | 6/1998 | Feigel et al. |
| 2002/0079736 A1 | 6/2002 | Soga |

(Continued)

FOREIGN PATENT DOCUMENTS

| CN | 1757551 A | 4/2006 |
| EP | 1 642 795 A1 | 4/2006 |

(Continued)

OTHER PUBLICATIONS

International Search Report Issued Dec. 28, 2009 in PCT/JP09/05686 Filed Oct. 28, 2009.

(Continued)

*Primary Examiner* — Robert A Siconolfi
*Assistant Examiner* — Mahbubur Rashid
(74) *Attorney, Agent, or Firm* — Oblon, McClelland, Maier & Neustadt, L.L.P.

(57) ABSTRACT

A brake control system has a manual fluid pressure source and a power fluid pressure source. A fluid pressure actuator forms an X-pipe having a first channel and a second channel. The power fluid pressure source supplies the operating fluid to each wheel by using the first channel and the second channel. A channel system including the first channel and a channel system including the second channel can be isolated from each other by an isolation valve. The fluid pressure actuator includes a regulation unit configured to regulate a state of supplying the operating fluid such that a difference between a state occurring when the operating fluid is supplied to one of the first channel and the second channel after passing through the isolation valve, and a state occurring when the operating fluid is supplied to the other channel without passing through the isolation valve, is reduced.

5 Claims, 9 Drawing Sheets

(51) Int. Cl.
    *B60T 7/04*          (2006.01)
    *B60T 13/66*        (2006.01)
    *B60T 13/68*        (2006.01)
    *B60T 8/34*         (2006.01)
    *B60L 7/18*         (2006.01)
    *B60L 7/26*         (2006.01)
    *B60L 11/12*        (2006.01)
    *B60L 11/14*        (2006.01)
    *B60L 15/20*        (2006.01)

(52) U.S. Cl.
    CPC . *B60T 8/348* (2013.01); *B60L 7/18* (2013.01); *B60L 7/26* (2013.01); *B60L 11/126* (2013.01); *B60L 11/14* (2013.01); *B60L 15/2009* (2013.01); *Y02T 10/7077* (2013.01); *Y02T 10/7005* (2013.01); *Y02T 10/6217* (2013.01); *Y02T 10/70* (2013.01)
    USPC ............ 303/9.68; 303/20; 303/60; 303/84.2; 303/113.4; 303/119.1; 180/65.21; 180/65.265; 180/65.275

(56) References Cited

U.S. PATENT DOCUMENTS

| 2006/0066146 | A1 | 3/2006 | Otomo |
| 2006/0071543 | A1* | 4/2006 | Nakayasu ................. 303/113.1 |
| 2006/0152076 | A1 | 7/2006 | Inagaki et al. |

FOREIGN PATENT DOCUMENTS

| JP | 5 19041 | 3/1993 |
| JP | 11 321612 | 11/1999 |
| JP | 2002-130449 A | 5/2002 |
| JP | 2002-187537 A | 7/2002 |
| JP | 2002 347601 | 12/2002 |
| JP | 2006 193045 | 7/2006 |
| JP | 4333677 | 9/2009 |
| JP | 2009 234490 | 10/2009 |

OTHER PUBLICATIONS

Office Action and Extended European Search Report issued Aug. 7, 2013 in European Patent Application 09850787.4.

* cited by examiner

FIG.3

| NUMBER OF CLOSED ABS HOLDING VALVES | FR WHEEL | FL WHEEL | RR WHEEL | RL WHEEL | ABS CONTROL MODE | CONTROL GAIN OF PRESSURE-INCREASING LINEAR CONTROL VALVE |
|---|---|---|---|---|---|---|
| 4 | Close | Close | Close | Close | 1 | 1 |
| 3 | Close | Close | Open | Close | 2 | 2 |
| | Close | Close | Close | Open | | |
| | Open | Close | Close | Close | 3 | 3 |
| | Close | Open | Close | Close | | |
| 2 | Close | Close | Open | Open | 4 | 4 |
| | Open | Close | Open | Close | 5 | 5 |
| | Open | Close | Close | Open | | |
| | Close | Open | Open | Close | | |
| | Close | Open | Close | Open | | |
| | Open | Open | Close | Close | 6 | 6 |
| 1 | Close | Open | Open | Open | 7 | 7 |
| | Open | Close | Open | Open | | |
| | Open | Open | Close | Open | 8 | 8 |
| | Open | Open | Open | Close | | |
| 0 | Open | Open | Open | Open | 9 | 9 |

BRAKE CONTROL DEVICE

TECHNICAL FIELD

The present invention relates to a brake control system configured to control braking force to be provided to a wheel of a vehicle.

BACKGROUND ART

For example, a brake control system is described in Patent Document 1, in which braking force is controlled while a degree of freedom in controlling the fluid pressure in each of the wheel cylinders for four wheels is increased depending on a situation. This system includes both a power fluid pressure source in which pressure accumulation by an operating fluid is possible with the use of power and a manual fluid pressure source for increasing the pressure of the operating fluid in accordance with an amount of a brake operation by a driver, so that the fluid pressure in the wheel cylinder can be controlled by the respective fluid pressure sources. A fluid pressure channel, which commonly controls the left front wheel, right front wheel, left rear wheel, and right rear wheel, is connected to the power fluid pressure source to perform the control for increasing the pressure in each of the wheel cylinders for four wheels.

On the other hand, a fluid pressure channel for the front wheels, which controls the left front wheel and right front wheel, and that for the rear wheels, which controls the left rear wheel and right rear wheel, are connected to the manual fluid pressure source. Further, an isolation valve is provided, by which the channel for the left front wheel and right front wheel and that for the left rear wheel and right rear wheel can be isolated from each other. For example, when a pressure-increasing control from the power fluid pressure source cannot be sufficiently performed due to occurrence of fluid leakage in one of the aforementioned fluid pressure channels connected to the respective wheel cylinders, braking only by the fluid pressure channel for the front wheels or that for the rear wheels is performed: by switching to a fluid pressure control with the use of the manual fluid pressure source; and by isolating, from the manual fluid pressure source, the fluid pressure channel for the front wheels or that for the rear wheels, including the fluid pressure channel in which the fluid leakage has occurred, with the isolation valve being closed. Thus, by configuring a braking force control to be capable of being isolated into a control system for the front wheels and that for the rear wheels, braking force can be secured only by the front wheels or the rear wheels, thereby allowing a vehicle to be braked even if a failure occurs in one of the two fluid pressure channels.

Similarly, a brake control system having a power fluid pressure source and a manual fluid pressure source is disclosed in Patent Document 2. Also, in this system, a fluid pressure channel for front wheels and that for rear wheels are connected to the manual fluid pressure source such that a brake control can be performed only by the front wheels or rear wheels with the use of the manual fluid pressure source.

Patent Documents

[Patent Document 1] Japanese Patent Application Publication No. 2007-203859
[Patent Document 2] Japanese Patent Application Publication No. 2002-187537

DISCLOSURE OF THE INVENTION

Problem to be Solved by the Invention

Because heavy parts, such as a power source, a transmission, and a steering system, are mounted on the front wheel side of a vehicle, a brake system having larger braking capability than that of the brake system on the rear wheel side is mounted on the front wheel side. In other words, on the rear wheel side, a cheaper brake system having smaller braking capability or a smaller-sized brake system, when compared with that on the front wheel side, has been used. However, when braking force is secured only by front wheels or rear wheels in a braking force control with the use of an operating fluid from a manual fluid pressure source, as in the aforementioned Patent Documents 1 and 2, it is needed to secure the braking force specified by regulations in each of the braking only by the front wheels or that only by the rear wheels. Namely, it is needed that a brake system having the same braking capability as that of a brake system on the front wheel side is mounted on the rear wheel side. As a result, there occurs a problem that a restriction on the distribution of a vehicle weight and that on the capability of the brake system for the rear wheels become strict. Also, there occurs a problem that, because it is needed to use a brake system having large braking capability as a brake system for the rear wheels, a reduction in cost or weight is hampered.

In view of these situations, a purpose of the present invention is to provide a brake control system in which sufficient braking force can be exerted without a decrease in a braking feeling, when a power fluid pressure source and a manual fluid pressure source are provided and even when a brake system on the rear wheel side and that on front wheel side, one having braking capability different from the other, are mounted for a reduction in cost or size.

Means for Solving the Problem

A brake control system according to an embodiment of the present invention comprises: a manual fluid pressure source configured to increase the pressure of a contained operating fluid in accordance with an amount of a brake operation by a driver; a power fluid pressure source in which pressure accumulation by the operating fluid is possible with the use of power independent of a brake operation by a driver; a fluid volume control valve configured to control a fluid volume of the operating fluid to be supplied from the power fluid pressure source toward a wheel cylinder for each wheel; an isolation valve capable of isolating fluid communication into both a first channel through which the operating fluid from the manual fluid pressure source can be supplied to a wheel cylinder for the left front wheel and that for the right rear wheel, and a second channel through which the operating fluid from the manual fluid pressure source can be supplied to a wheel cylinder for the right front wheel and that for the left rear wheel; and a regulation unit configured to regulate, when the operating fluid having passed through the fluid volume control valve is supplied from the first channel and the second channel to each wheel cylinder, a state of supplying the operating fluid such that a difference between a state occurring when the operating fluid is supplied to one of the first channel and the second channel after passing through the isolation valve, and a state occurring when the operating fluid is supplied to the other channel without passing through the isolation valve, is reduced.

According to the embodiment, braking for the left front wheel and right rear wheel is performed by the first channel, while that for the right front wheel and left rear wheel is performed by the second channel. Therefore, even if a failure occurs in one of the channels and accordingly a brake control is performed only by the other channel, a brake system for the front wheel and that for the rear wheel can be both used. As a result, even when a brake system for the front wheel and that for the rear wheel, each having a braking performance different from that of the other, are used, sufficient braking force can be obtained in the same brake feeling as each other during braking using the first channel and during that using the second channel. Further, when the operating fluid having passed through the fluid volume control valve is supplied to both of the first channel and second channel, which have been isolated from each other by the presence of the isolation valve, a state of supplying the operating fluid can be regulated by an action of the regulation unit such that a difference between a state occurring when the operating fluid is supplied to one of the first channel and the second channel after passing through the isolation valve, and a state occurring when the operating fluid is supplied to the other channel without passing through the isolation valve, is reduced. Herein, the state of supplying the operating fluid means a concept including a state occurring when the operating fluid is supplied, such as a flow rate or pressure of the operating fluid, and a timing of the supply. As a result, occurrence of a differential pressure or a response difference between the channel passing through the isolation valve and the channel not passing therethrough is suppressed, and hence braking well balanced among four wheels can be achieved. That is, even when a brake system on the rear wheel side and that on the front wheel side, one having braking capability different from the other, are mounted, sufficient braking force can be exerted without a decrease in a brake feeling.

Alternatively, in the aforementioned embodiment, the brake control system may further comprise: a plurality of on-off valves that are provided for the each wheel cylinder to determine whether the operating fluid is supplied to the wheel cylinder; and a valve controller configured to control on-off states of the fluid volume control valve and the on-off valves, in which, when switching an on-off state of the on-off valve, the valve controller does not change a control state of the fluid volume control valve for a predetermined period of time. Because the flow pressure of the operating fluid is drastically changed by switching an on-off state of the on-off valve, a flow pressure that has fluctuated temporarily, greatly, and up-down from the flow pressure to be targeted by the fluid volume control valve, occurs. If the valve controller controls the fluid volume control valve following the temporal change in the flow pressure, the control becomes too excessive, which causes a vibration or an abnormal noise. Accordingly, it is configured that, when switching an on-off state of the on-off valve, the valve controller does not temporarily change a control state of the fluid volume control valve. That is, the valve controller changes a control state of the fluid volume control valve when a predetermined period of time has elapsed after the switching of an on-off state of the on-off valve and when the flow pressure is stabilized. As a result, excessive on-off controls, occurring when an on-off state has been switched, are suppressed, which can suppress occurrence of a vibration or abnormal noise that may occur during the operation of the fluid volume control valve.

Alternatively, in the aforementioned embodiment, the brake control system may further comprise: a plurality of on-off valves that are provided for the each wheel cylinder to determine whether the operating fluid is supplied to the wheel cylinder; and a valve controller configured to control on-off states of the fluid volume control valve and the on-off valves, in which, when individually controlling each on-off valve and when supplying the operating fluid having passed through the fluid volume control valve toward the each wheel cylinder, an on-off state of the on-off valve is switched such that the valve controller controls the fluid volume control valve by a control gain in correspondence with the number of the on-off valves that are simultaneously switched. According to this embodiment, a control gain is determined, taking into consideration a fluctuation in the flow pressure of the operating fluid based on the number of the on-off valves whose on-off states have been switched. Because a control gain suitable for a fluctuation in the flow pressure is used, occurrence of a vibration or abnormal noise resulting from a fluctuation in the flow pressure can be suppressed. It is desirable to acquire, in advance from experiments, etc., the correspondence relationship between the number of the on-off valves whose on-off states have been switched and a change in the flow pressure occurring at the time, and to determine an optimal control gain such that occurrence of a vibration or abnormal noise resulting from a fluctuation in the flow pressure can be suppressed.

Alternatively, in the aforementioned embodiment, the brake control system may further comprise: a plurality of on-off valves that are provided for the each wheel cylinder to determine whether the operating fluid is supplied to the wheel cylinder; a regulator that is formed in the manual fluid pressure source to regulate a fluid pressure of the operating fluid supplied from the power fluid pressure source in accordance with an amount of a brake operation by a driver; a regulator channel configured to connect a region between the isolation valve and the regulation unit to the regulator; and a valve controller configured to control on-off states of the fluid volume control valve and the on-off valves, in which, when individually controlling the each on-off valve, the valve controller switches supply of the operating fluid having passed through the fluid volume control valve to supply of the operating fluid having passed through the regulator. For example, an anti-lock brake control system (ABS control) can be performed by a fluid pressure control that is achieved only by on-off of the on-off valves with a regulator pressure being supplied from the regulator to each control valve, not by a fine fluid pressure control in which each on-off valve is controlled by using the fluid volume control valve. As a result, because an operation of the fluid volume control valve can be omitted during the ABC control, the usage frequency thereof can be reduced, thereby contributing to extension of the life of the fluid volume control valve.

A brake control system according to an embodiment of the present invention comprises: a power fluid pressure source in which pressure accumulation by an operating fluid is possible with the use of power independent of a brake operation by a driver; a manual fluid pressure source configured to increase the pressure of the contained operating fluid in accordance with an amount of a brake operation by a driver; a regulator configured to regulate a fluid pressure of the operating fluid supplied from the power fluid pressure source in accordance with the amount of the brake operation by the driver; a cutoff valve capable of cutting off a channel for the operating fluid supplied from the power fluid pressure source toward a wheel cylinder for each wheel; a fluid volume control valve configured to control an amount of the operating fluid supplied from the regulator toward each wheel cylinder; an isolation valve capable of isolating fluid channel into both a first channel through which the operating fluid from the manual fluid pressure source can be supplied to a wheel cylinder for the left front wheel and that for the right rear wheel, and a second channel through which the operating fluid from the manual fluid pressure source can be supplied to a wheel cylinder for the right front wheel and that for the left rear wheel; a regulation unit configured to regulate, when the operating fluid having passed through the fluid volume control valve is supplied from the first channel or the second channel toward the each wheel cylinder or when the operating fluid having passed through the cutoff valve is supplied from the first channel or the second channel toward the each wheel cylinder, a state of supplying the operating fluid such that a difference between a state occurring when the operating fluid is supplied to one of the first channel and the second channel after passing through the isolation valve, and a state occurring when the operating fluid is supplied to the other channel without passing through the isolation valve, is reduced; and a valve controller configured to control on-off of each valve.

According to this embodiment, braking of the left front wheel and right rear wheel is performed by the first channel, while that of the right front wheel and left rear wheel is performed by the second channel. Therefore, even if a failure occurs in one of the channels and accordingly a brake control is performed only by the other channel, a brake system for the front wheel and that for the rear wheel can be both used. As a result, even when a brake system for the front wheels and that for the rear wheels, each having a braking performance different from that of the other, are used, sufficient braking force can be obtained with the same brake feeling as each other during braking using the first channel and during that using the second channel. Further, because a fluid pressure, which has been regulated, by the regulator, to be lower than the fluid pressure supplied from the power fluid pressure source, is supplied to the fluid volume control valve and the regulated fluid pressure can be supplied to each on-off valve, a load onto the fluid volume control valve can be reduced, which can contribute to extension of the life of the fluid volume control valve. Further, when the operating fluid having passed through the fluid volume control valve is supplied to both of the first channel and second channel, which have been isolated from each other by the presence of the isolation valve, a state of supplying the operating fluid can be regulated by an action of the regulation unit such that a difference between a state occurring when the operating fluid is supplied to one of the first channel and the second channel after passing through the isolation valve, and a state occurring when the operating fluid is supplied to the other channel without passing through the isolation valve, is reduced. As a result, occurrence of a differential pressure or a response difference between the channel passing through the isolation valve and the channel not passing therethrough is suppressed, and hence braking well balanced among four wheels can be achieved. That is, even when a brake system on the rear wheel side and that on the front wheel side, one having braking capability different from the other, are mounted, sufficient braking force can be exerted without a decrease in a brake feeling.

Alternatively, in the aforementioned embodiment, the regulation unit may be composed of an orifice. A flow resistance with respect to the operating fluid, occurring by the aperture of the orifice, can be made equal to the flow resistance occurring when the fluid pressure passes through the isolation valve. As a result, the structure can be simplified in comparison with the case where the regulation unit is configured by the same mechanism as the isolation valve, thereby allowing the cost to be reduced. Further, because an orifice only has a function of changing a flow resistance by its aperture, it becomes unnecessary to manage its operations.

Advantage of the Invention

According to the present invention, sufficient braking force can be exerted without a decrease in braking feeling, when a power fluid pressure source and a manual fluid pressure source are provided and even when a brake system on the rear wheel side and that on the front wheel side, one having braking capability different from the other, are mounted for a reduction in cost or size.

BRIEF DESCRIPTION OF THE DRAWINGS

FIG. 3 is a table explaining the relationship between operating states of holding valves and control gains of fluid volume control valves in the brake control system according to the embodiment of the invention;

REFERENCE NUMERALS

Figure 1:
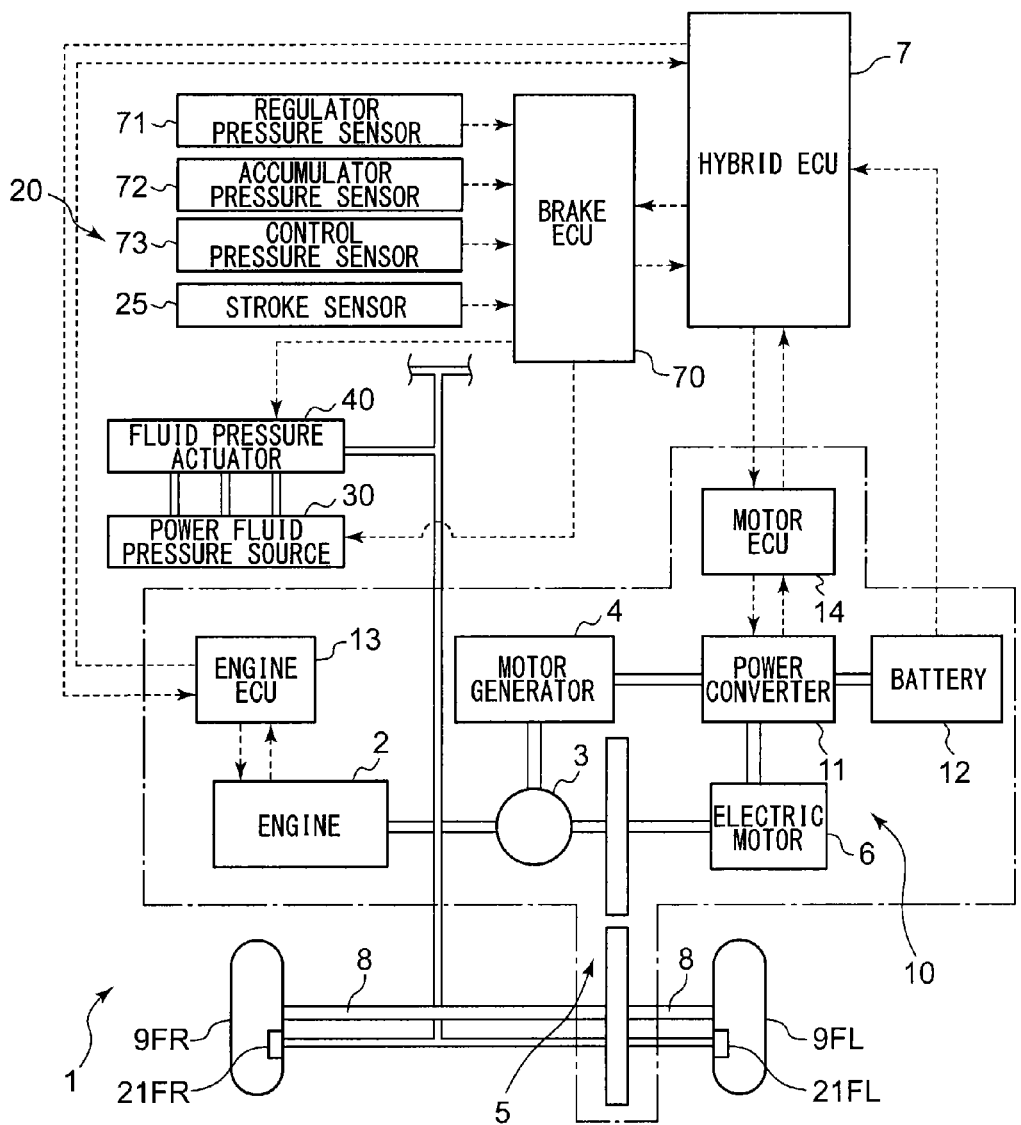
FIG. 1 is a schematic configuration view illustrating a vehicle to which a brake control system according to an embodiment of the present invention has been applied.

20 FLUID PRESSURE BRAKE UNIT
27 MASTER CYLINDER UNIT
30 POWER FLUID PRESSURE SOURCE
35 ACCUMULATOR
36 PUMP
37 FIRST MASTER PIPE
38 SECOND MASTER PIPE
40 FLUID PRESSURE ACTUATOR
51 to 54 ABS HOLDING VALVE
56 to 59 ABS PRESSURE-REDUCING VALVE
60 ISOLATION VALVE
66 PRESSURE-INCREASING LINEAR CONTROL VALVE
67 PRESSURE-REDUCING LINEAR CONTROL VALVE
70 BRAKE ECU
100 ORIFICE

BEST MODE FOR CARRYING OUT THE INVENTION

A brake control system according to an embodiment of the present invention has a manual fluid pressure source and a power fluid pressure source as a fluid pressure supply source for supplying fluid pressure to each wheel. The manual fluid pressure source in this brake control system is connected to a fluid pressure actuator of a so-called "X-pipe" type in which a first channel, for supplying an operating fluid to wheel cylinders for the left front wheel and right rear wheel, and a second channel, for supplying it to wheel cylinders for the right front wheel and left rear wheel, are connected to the manual fluid pressure source. Thus, by forming the two system pipes from the manual fluid pressure source into the "X-pipe", if a fail, such as fluid leakage, occurs in one of the first channel and the second channel, braking can be performed by the other channel and by both a brake system for one of the front wheels and that for one of the rear wheels, the one of the rear wheels being positioned diagonally with the one of the front wheels.

As a result, even if a fail occurs in either channel of the two systems, a brake system on the front wheel side and that on the rear wheel side can be respectively used. Further, even when a brake system for the front wheel and that for the rear wheel, the two brake systems having braking performances different from each other, are used, similar braking force can be acquired in each of the two systems. For example, a brake system on the rear wheel side having a braking performance smaller than that of a brake system on the front wheel side, in correspondence with the distribution of a vehicle weight, can be used, thereby contributing to a reduction in the size and cost of a brake system.

When the aforementioned "X-pipe" is adopted in a so-called electronically controlled brake system (ECB) in which the operating fluid is supplied from the power fluid pressure source to each wheel cylinder via a fluid volume control valve, based on an amount of a brake operation by a driver or on an automatic control of a vehicle, there is an issue to be considered. That is, when the ECB operates normally, it is needed to form a main channel for supplying the operating fluid having passed through the fluid volume control valve commonly to four wheels. On the other hand, in order to deal with the case where a fail occurs in a channel, as stated above, it is needed to provide an isolation valve in the main channel to isolate into two system channels. Accordingly, when the operating fluid having passed through the fluid volume control valve is supplied commonly to the four wheels, a channel passing through the isolation valve and that not passing therethrough are generated. As a result, a pressure difference or a response lag sometimes occurs between the first channel and the second channel.

Accordingly, in an embodiment of the present invention, a regulation unit configured to regulate a state of supplying the operating fluid is provided, in which a difference between a state occurring when the operating fluid is supplied to one of the first channel and the second channel after passing through the isolation valve, and a state occurring when the operating fluid is supplied to the other channel without passing through the isolation valve, is reduced. By providing the regulation unit, occurrence of a pressure difference or a response lag between the first channel and second channel is suppressed, thereby improving a brake feeling.

FIG. 1 is a schematic configuration view illustrating a vehicle to which a brake control system according to an embodiment of the present invention has been applied. The vehicle 1 illustrated in the view is formed as a so-called hybrid vehicle, and comprises: an engine 2; a 3-shaft power division mechanism 3 connected to a crankshaft, an output axis of the engine 2; a motor generator 4 by which power can be generated, connected to the power division mechanism 3; an electric motor 6 connected to the power division mechanism 3 via a transmission 5; and an electronic control unit 7 for a hybrid vehicle (hereinafter, referred to as a "hybrid ECU", and every electronic control unit is referred to as an "ECU"), which controls the whole drive system of the vehicle 1. A right front wheel 9FR and a left front wheel 9FL, which are drive wheels of the vehicle 1, are connected to the transmission 5 via a drive shaft 8.

The engine 2 is an internal combustion engine operated by using a hydrocarbon fuel, such as, for example, gasoline, gas oil, or the like, and is controlled by an engine ECU 13. The engine ECU 13 can communicate with the hybrid ECU 7, and performs a fuel injection control, an ignition control, and an intake control, etc., of the engine 2 based on a control signal from the hybrid ECU 7 and signals from various sensors for detecting operating states of the engine 2. The engine ECU 13 provides information on the operating states of the engine 2 to the hybrid ECU 7, if necessary.

The power division mechanism 3 plays: the role of communicating the output of the electric motor 6 to the right and left front wheels 9FR and 9FL via the transmission 5; the role of distributing the output of the engine 2 to the motor generator 4 and the transmission 5; and the role of decelerating or accelerating the rotational speed of the electric motor 6 or the engine 2. Each of the motor generator 4 and the electric motor 6 is connected to a battery 12 via a power converter 11 including an inverter, and a motor ECU 14 is connected to the power converter 11. A storage battery, such as, for example, a nickel-hydrogen storage battery, can be used as the battery 12. The motor ECU 14 can also communicate with the hybrid ECU 7 and controls, via the power converter 11, the motor generator 4 and the electric motor 6 based on a control signal from the hybrid ECU 7, etc. Each of the aforementioned hybrid ECU 7, engine ECU 13, and motor ECU 14 is formed as a microprocessor including a CPU, and includes a ROM for storing various programs, a RAM for temporarily storing data, an input/output port, and a communication port, etc., in addition to the CPU.

The right and left front wheels 9FR and 9FL can be driven by an output of the electric motor 6 under the control of the hybrid ECU 7 and the motor ECU 14, while power is being supplied from the battery 12 to the electric motor 6 via the power converter 11. The vehicle 1 is driven by the engine 2 in an operating area where the engine operates at a good efficiency. At the time, by communicating part of the output of the engine 2 to the motor generator 4 via the power division mechanism 3, it becomes possible to drive the electric motor 6 by using the power generated by the motor generator 4 or to charge the battery 12 via the power converter 11.

While the vehicle 1 is being braked, the electric motor 6 is rotated by the power communicated from the front wheels 9FR and 9FL under the control of the hybrid ECU 7 and the motor ECU 14, so that the electric motor 6 is operated as a power generator. That is, the electric motor 6, the power converter 11, the hybrid ECU 7, and the motor ECU 14, etc., function as a regenerative brake unit 10 that provides braking force to the right and left front wheels 9FR and 9FL by regenerating the kinetic energy of the vehicle 1 to an electric energy.

The brake control system according to the embodiment generates required braking force by performing a brake regeneration cooperative control in which the regenerative braking force and the friction braking force are used in combination. The regenerative braking force means braking force provided to a wheel by operating an electric motor for driving the wheel as a power generator in which the rotating torque of a moving wheel is inputted. The kinetic energy of a vehicle is converted into an electric energy, and the electric energy is accumulated in the storage battery by being communicated from the electric motor via the power converter including an inverter. The accumulated electric energy is used for the subsequent driving of wheels, etc., thereby contributing to the improvement in the fuel consumption of a vehicle. On the other hand, the friction braking force means braking force provided to a wheel by pressing a friction member against a rotating member that is rotated with the wheel. Hereinafter, the fluid pressure braking force generated by pressing the friction member against the rotating member with the supply of the brake fluid as an operating fluid from a fluid pressure source will be described as an example of the friction braking force. In order to improve the fuel consumption to a higher level, it is desirable to preferentially use the regenerative braking force and to complementarily generate, by the fluid pressure braking force, the braking force corresponding to a shortage for the required braking force, occurring when only the regenerative braking force is used.

Figure 2:
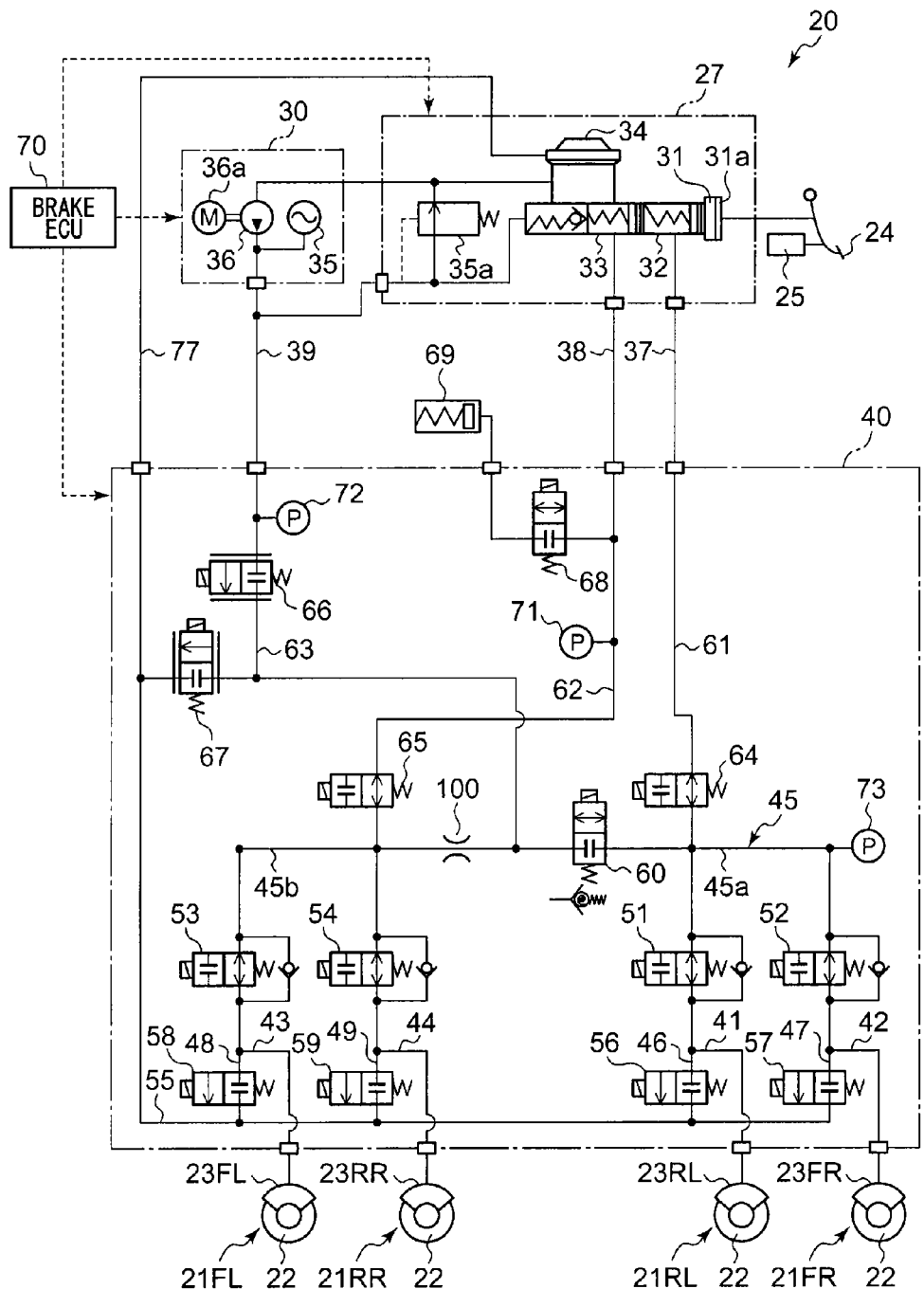
FIG. 2 is a system view illustrating a fluid pressure brake unit according to the embodiment of the invention.

As illustrated in FIG. 2, the vehicle 1 comprises a fluid pressure brake unit 20 configured to generate braking force by supplying a brake fluid from a power fluid pressure source 30, etc., in addition to the regenerative brake unit 10. In the vehicle 1, desired braking force can be generated by using the regenerative braking force and the fluid pressure braking force in combination, with a brake regeneration cooperative control being performed.

FIG. 2 is a system view illustrating the fluid pressure brake unit 20 according to the embodiment. As illustrated in FIG. 2, the fluid pressure brake unit 20 includes: disc brake units 21FR, 21FL, 21RR, and 21RL, all of which are provided to correspond to respective wheels; a master cylinder unit 27, the power fluid pressure source 30; and a fluid pressure actuator 40.

The disc brake units 21FR, 21FL, 21RR, and 21RL provide braking force to the right front wheel, left front wheel, right rear wheel, and left rear wheel of the vehicle, respectively. The master cylinder unit 27 according to the present embodiment, as a manual fluid pressure source, sends out the brake fluid to the disc brake units 21FR to 21RL, the pressure of the brake fluid being increased in accordance with an operation amount of a brake pedal 24, as a brake operating member, by a driver. The power fluid pressure source 30 can send out, to the disc brake units 21FR to 21RL, the brake fluid whose pressure has been increased by the supply of power, independently of the operation of the brake pedal 24 by a driver. The fluid pressure actuator 40 appropriately regulates the pressure of the brake fluid supplied from the power fluid pressure source 30 or the master cylinder unit 27, and sends out the brake fluid to the disc brake units 21FR to 21RL. Thereby, the fluid pressure braking force for each wheel can be regulated.

Hereinafter, each of the disc brake units 21FR to 21RL, the master cylinder unit 27, the power fluid pressure source 30, and the fluid pressure actuator 40 will be described in more detail. The disc brake units 21FR to 21RL include a brake disk 22 and the wheel cylinders 23FR to 23RL built into a brake caliper, respectively. Each of the wheel cylinders 23FR to 23RL is connected to the fluid pressure actuator 40 via a fluid channel different from that for another wheel cylinder. Hereinafter, the wheel cylinders 23FR to 23RL will be appropriately and collectively referred to as a "wheel cylinder 23".

In each of the disc brake units 21FR to 21RL, a brake pad, as the friction member, is pressed against the brake disk 22 that is rotated with the wheel, when the brake fluid is supplied from the fluid pressure actuator 40 to the wheel cylinder 23. Thereby, braking force is provided to each wheel. In the embodiment, the disk brake units 21FR to 21RL are used; however, another braking force providing mechanism including the wheel cylinder 23, such as, for example, a drum brake, may be used.

In the present embodiment, the master cylinder unit 27 is a master cylinder with a fluid pressure booster whose master cylinder is composed of two chambers, and includes a fluid pressure booster 31a, a regulator 31, a first master cylinder 32, a second master cylinder 33, and a reservoir 34. The fluid pressure booster 31a is communicated to the regulator 31 into which the high-pressure brake fluid is introduced from the power fluid pressure source 30. The fluid pressure booster 31a is connected to the brake pedal 24 to communicate pedal tread force applied onto the brake pedal 24 after amplifying the tread force to the first master cylinder 32 and the second master cylinder 33. That is, by the brake fluid being supplied from the power fluid pressure source 30 to the fluid pressure booster 31a via the regulator 31, the tread force on the pedal is amplified. The first master cylinder 32 and the second master cylinder 33 generate master cylinder pressures each having a predetermined multiplication ratio with respect to the tread force on the pedal, the master cylinder pressures being the same with each other.

The reservoir 34 for reserving the brake fluid is arranged above the first master cylinder 32, the second master cylinder 33, and the regulator 31. The first master cylinder 32 and the second master cylinder 33 communicate with the reservoir 34 when the stepping-on of the brake pedal 24 is released. On the other hand, the regulator 31 communicates with both the reservoir 34 and an accumulator 35 of the power fluid pressure source 30 to make the reservoir 34 to be a low-pressure source and the accumulator 35 to be a high-pressure source, thereby allowing a fluid pressure almost the same as the master cylinder pressure to be generated. Hereinafter, the fluid pressure in the regulator 31 is appropriately referred to as a "regulator pressure". It is not needed to make the master cylinder pressure and the regulator pressure to be exactly the same as each other, and it is also possible to design the master cylinder unit 27 such that, for example, the regulator pressure is slightly higher than the master cylinder pressure.

The power fluid pressure source 30 includes the accumulator 35 and a pump 36. The accumulator 35 converts the pressure energy of the brake fluid whose pressure has been increased by the pump 36 into the pressure energy of a filler gas, such as nitrogen, for example, into approximately 14 to 22 MPa, and accumulates the energy. The pump 36 has a motor 36a as a driving source, and the suction port of the pump is connected to the reservoir 34, while the discharge port thereof is connected to the accumulator 35. The accumulator 35 is also connected to a relief valve 35a provided in the master cylinder unit 27. If the pressure of the brake fluid in the accumulator 35 is abnormally increased to, for example, approximately 25 MPa, the relief valve 35a is opened to return the high-pressure brake fluid into the reservoir 34.

As stated above, the fluid pressure brake unit 20 has the first master cylinder 32, the second master cylinder 33, and the accumulator 35, as a supply source of the brake fluid to the wheel cylinder 23. A first master pipe 37, a second master pipe 38, and an accumulator pipe 39 are connected to the first master cylinder 32, the second master cylinder 33, and the accumulator 35, respectively. Each of the first master pipe 37, the second master pipe 38, and the accumulator pipe 39 is connected to the fluid pressure actuator 40.

The fluid pressure actuator 40 includes both an actuator block in which a plurality of channels are formed and a plurality of electromagnetic control valves. The channels formed in the actuator block include individual channels 41, 42, 43, and 44 and a main channel 45. The individual channels 41 to 44 are respectively branched from the main channel 45 to be respectively connected to the wheel cylinders 23FR, 23FL, 23RR, and 23RL of the corresponding disc brake units 21FR, 21FL, 21RR, and 21RL. Thereby, each wheel cylinder 23 can communicate with the main channel 45.

ABS holding valves 51, 52, 53, and 54, all of which are on-off valves, are provided in the middle of the individual channels 41, 42, 43, and 44, respectively. Each of the ABS holding valves 51 to 54 has a solenoid on which an ON-OFF control is performed and a spring, and is a normally-open electromagnetic control valve that is opened when the solenoid is not powered. Each of the ABS holding valves 51 to 54, in an open state, can distribute the brake fluid bidirectionally. That is, it becomes possible to make the brake fluid flow from the main channel 45 to the wheel cylinder 23, and vice versa, from the wheel cylinder 23 to the main channel 45. When the solenoid is powered and each of the ABS holding valves 51 to 54 is closed, the flow of the brake fluid is blocked in the individual channels 41 to 44.

The wheel cylinder 23 is further connected to a reservoir channel 55 via pressure-reducing channels 46, 47, 48, and 49 respectively connected to the individual channels 41 to 44. Each of ABS pressure-reducing valves 56, 57, 58, and 59 is provided in the middle of each of the pressure-reducing channels 46, 47, 48, and 49. Each of the ABS pressure-reducing valves 56 to 59 has a solenoid on which an ON-OFF control is performed and a spring, and is a normally-closed electromagnetic control valve that is closed when the solenoid is not powered. When each of the ABS pressure-reducing valves 56 to 59 is closed, the flow of the brake fluid is blocked in the pressure-reducing channels 46 to 49. When the solenoid is powered to open each of the ABS pressure-reducing valves 56 to 59, the flow of the brake fluid is permitted in the pressure-reducing channels 46 to 49, so that the brake fluid is returned into the reservoir 34 from the wheel cylinder 23 via the pressure-reducing channels 46 to 49 and the reservoir channel 55. The reservoir channel 55 is connected to the reservoir 34 in the master cylinder unit 27 via a reservoir pipe 77.

The main channel 45 has an isolation valve 60 in the middle thereof. The main channel 45 is divided, by this isolation valve 60, into a first channel 45a to be connected to the individual channels 41 and 42 and a second channel 45b to be connected to the individual channels 43 and 44. The first channel 45a is connected, via the individual channels 41 and 42, to both the wheel cylinder 23RL for the left rear wheel and the wheel cylinder 23FR for the right front wheel, while the second channel 45b is connected, via the individual channels 43 and 44, to both the wheel cylinder 23FL for the left front wheel and the wheel cylinder 23RL for the right rear wheel. That is, two system channels are connected to the front/rear and right/left four wheel cylinders 23 in a so-called "X-pipe" mode in which the two system channels are cross-coupled together. The characteristics of the "X-pipe" will be described later.

The isolation valve 60 has a solenoid on which an ON-OFF control is performed and a spring, and is a normally-closed electromagnetic control valve that is closed when the solenoid is not powered. When the isolation valve 60 is in a closed state, the flow of the brake fluid is blocked in the main channel 45. When the solenoid is powered to open the isolation valve 60, the brake fluid can be distributed bidirectionally between the first channel 45a and the second channel 45b.

The regulation unit, a characteristic configuration of the fluid pressure actuator 40 according to the present embodiment, is provided in one of the first channel 45a and the second channel 45b, which have been isolated from each other by the isolation valve 60. In the case of FIG. 2, the regulation unit is provided in the second channel 45b and has a function of regulating a flow rate by providing a predetermined flow resistance to the second channel 45b. In FIG. 2, an example in which the regulation unit is composed of an orifice 100 is illustrated. The cross-area of the orifice 100 is regulated such that a flow resistance occurring when the brake fluid is passing through the orifice 100 is substantially the same as that occurring when the brake fluid is passing through the isolation valve 60, when the valve 60 is opened. Advantages of the arrangement of the orifice 100 will be described in detail later. As illustrated in FIG. 2, the isolation valve 60 is configured to be opened in a direction in which the brake fluid from the later-described pressure-increasing linear control valve 66 is easily introduced. With such a configuration, a decrease in the response of the wheel cylinder 23, occurring due to a delay in the opening of the valve when powered, is prevented.

A first master channel 61 and a second master cannel 62 both communicating with the main channel 45 are formed in the fluid pressure actuator 40. In more detail, the first master channel 61 is connected to the first channel 45a of the main channel 45, while the second master channel 62 is connected to the second channel 45b thereof. The first master channel 61 is connected to the first master pipe 37 communicating with the first master cylinder 32. The second master channel 62 is connected to the second master pipe 38 communicating with the second master cylinder 33.

The first master channel 61 has a first master cut valve 64 in the middle thereof. The first master cut valve 64 is provided in a supply channel of the brake fluid from the first master cylinder 32 to each wheel cylinder 23. The first master cut valve 64 has a solenoid on which an ON-OFF control is performed and a spring, and is a normally-open electromagnetic control valve that is opened when the solenoid is not powered, a closed state of the first master cut valve 64 being ensured by the electromagnetic force generated by the solenoid when receiving a supply of a specified control current. When opened, the first master cut valve 64 can distribute the brake fluid bidirectionally between the first master cylinder 32 and the first channel 45a of the main channel 45. When the first master cut valve 64 is closed by the solenoid being powered with the specified control current, the flow of the brake fluid is blocked in the first master channel 61.

The second master channel 62 has a second master cut valve 65 in the middle thereof. The second master cut valve 65 is formed in a supply channel of the brake fluid from the second master cylinder 33 to each wheel cylinder 23. The second master cut valve 65 has also a solenoid on which an ON-OFF control is performed and a spring, and is a normally-open electromagnetic control valve that is opened when the solenoid is not powered, a closed state of the second master cut valve 65 being ensured by the electromagnetic force generated by the solenoid when receiving a supply of a specified control current. When opened, the second master cut valve 65 can distribute the brake fluid bidirectionally between the second master cylinder 33 and the second channel 45b of the main channel 45. When the second master cut valve 65 is closed by the solenoid being powered, the flow of the brake fluid is blocked in the second master channel 62.

A stroke simulator 69 is connected, on the upstream side from the second master cut valve 65, to the second master channel 62 via a simulator cut valve 68. That is, the simulator cut valve 68 is provided in the channel connecting the second master cylinder 33 and the stroke simulator 69. The simulator cut valve 68 has a solenoid on which an ON-OFF control is performed and a spring, and is a normally-closed electromagnetic control valve that is closed when the solenoid is not powered, an open state of the simulator cut valve 68 being ensured by the electromagnetic force generated by the solenoid when receiving a supply of a specified control current. When the simulator cut valve 68 is in a closed state, the flow of the brake fluid is blocked between the second master channel 62 and the stroke simulator 69. When the simulator cut valve 68 is opened by the solenoid being powered, the brake fluid can be distributed bidirectionally between the second master cylinder 33 and the stroke simulator 69.

The stroke simulator 69 includes a plurality of pistons and springs to create reactive force in accordance with the tread force on the brake pedal 24 by a driver when the simulator cut valve 68 is released. In order to improve a feeling in a bake operation by a driver, it is preferable to adopt, as the stroke simulator 69, a stroke simulator having multi-stage spring properties.

An accumulator channel 63 is also formed in the fluid pressure actuator 40, in addition to the first master channel 61 and the second master channel 62. One end of the accumulator channel 63 is connected to a position between the isolation valve 60 and the orifice 100 in the main channel 45, while the other end thereof is connected to the accumulator pipe 39 communicating with the accumulator 35.

The accumulator channel 63 has, in the middle thereof, the pressure-increasing linear control valve 66 that functions as a fluid volume control valve. The accumulator channel 63 and the second channel 45*b* of the main channel 45 are connected to the reservoir channel 55 via a pressure-reducing linear control valve 67 that functions as a fluid volume control valve. Each of the pressure-increasing linear control valve 66 and the pressure-reducing linear control valve 67 has a linear solenoid and a spring, and is a normally-closed electromagnetic control valve that is closed when the solenoid is not powered. The valve opening angle of each of the pressure-increasing linear control valve 66 and the pressure-reducing linear control valve 67 is regulated to be proportionate to a current supplied to each solenoid.

The pressure-increasing linear control valve 66 is provided as a common pressure-increasing control valve among each of the multiple wheel cylinders 23 provided so as to correspond to each wheel. Similarly, the pressure-reducing linear control valve 67 is also provided as a common pressure-reducing control valve among each of the multiple wheel cylinders 23. That is, in the present embodiment, the pressure-increasing linear control valve 66 and the pressure-reducing linear control valve 67 are provided as a pair of common control valves for controlling the supply/discharge of the brake fluid that is sent out from the power fluid pressure source 30 to/from each of the wheel cylinders 23. It is preferable in terms of cost that the pressure-increasing linear control valve 66 and the pressure-reducing linear control valve 67 are provided so as to be common among each of the wheel cylinders 23, as stated above, in comparison with the case where a linear control valve is provided for every wheel cylinder 23.

Herein, the differential pressure between the inlet port and the outlet port of the pressure-increasing linear control valve 66 corresponds to the differential pressure between the pressure of the brake fluid in the accumulator 35 and that in the main channel 45, while the differential pressure between the inlet port and the outlet port of the pressure-reducing linear control valve 67 corresponds to the differential pressure between the pressure of the brake fluid in the main channel 45 and that in the reservoir 34. When it is assumed that: an electromagnetic drive force, corresponding to the supply power to the linear solenoid of each of the pressure-increasing linear control valve 66 and the pressure-reducing linear control valve 67, is F1; the biasing force of the spring is F2; and a differential pressure acting force, corresponding to the differential pressure between the inlet port and the outlet port of each of the pressure-increasing linear control valve 66 and the pressure-reducing linear control valve 67, is F3, the relationship of F1+F3=F2 is satisfied. Accordingly, by continuously controlling the supply power to the linear solenoid of each of the pressure-increasing linear control valve 66 and the pressure-reducing linear control valve 67, the differential pressure between the inlet port and the outlet port of each of the pressure-increasing linear control valve 66 and the pressure-reducing linear control valve 67 can be controlled.

In the fluid pressure brake unit 20, the power fluid pressure source 30 and the fluid pressure actuator 40 are controlled by the brake ECU 70. The brake ECU 70 is formed as a microprocessor including a CPU, and includes a ROM for storing various programs, a RAM for temporarily storing data, an input/output port, and a communication port, etc., in addition to the CPU. The brake ECU 70 can communicate with the higher-level hybrid ECU 7, etc., to control the pump 36 of the power fluid pressure source 30 and the electromagnetic control valves 51 to 54, 56 to 59, 60, and 64 to 68, all of which forms the fluid pressure actuator 40, based on a control signal from the hybrid ECU 7 and signals from various sensors.

A master pressure sensor 71, an accumulator pressure sensor 72, and a control pressure sensor 73 are connected to the brake ECU 70. The master pressure sensor 71 detects, on the upstream side from the second master cut valve 65, the pressure of the brake fluid in the second master channel 62, i.e., the second master cylinder pressure, and provides a signal indicating the detected pressure to the brake ECU 70. The accumulator pressure sensor 72 detects, on the upstream side from the pressure-increasing linear control valve 66, the pressure of the brake fluid in the accumulator channel 63, i.e., the accumulator pressure, and provides a signal indicating the detected pressure to the brake ECU 70. The control pressure sensor 73 detects the pressure of the brake fluid in the first channel 45*a* of the main channel 45, and provides a signal indicating the detected pressure to the brake ECU 70. The pressure detected by each of the pressure sensors 71 to 73 is sequentially provided to the brake ECU 70 at predetermined intervals to be stored and held in a predetermined storage area of the brake ECU 70.

When the first channel 45*a* and the second channel 45*b* of the main channel 45 communicate with each other by the isolation valve 60 being opened, the output value of the control pressure sensor 73 indicates the fluid pressure on the lower pressure side of the pressure-increasing linear control valve 66 and also indicates the fluid pressure on the higher pressure side of the pressure-reducing linear control valve 67. Accordingly, the output value can be used for the control of the pressure-increasing linear control valve 66 and the pressure-reducing linear control valve 67. When the pressure-increasing linear control valve 66 and the pressure-reducing linear control valve 67 are closed and when the first master cut valve 64 is opened, the output value of the control pressure sensor 73 indicates the first master cylinder pressure. Further, when the first channel 45*a* and the second channel 45*b* of the main channel 45 communicate with each other by the isolation valve 60 being opened and when each of the ABS holding valves 51 to 54 is opened and each of the ABS pressure-reducing valves 56 to 59 is closed, the output value of the control pressure sensor 73 indicates an operating fluid pressure that acts on each of the wheel cylinders 23, i.e., a wheel cylinder pressure.

Further, a stroke sensor 25 provided in the brake pedal 24 is also included in the sensors connected to the brake ECU 70. The stroke sensor 25 detects a pedal stroke as an operation amount of the brake pedal 24, and provides a signal indicating the detected stroke to the brake ECU 70. The output value of the stroke sensor 25 is also sequentially provided to the brake ECU 70 at predetermined intervals to be stored and held in a predetermined storage area of the brake ECU 70. Alternatively, a means for detecting an operating state of the brake, other than the stoke sensor 25, may be provided and connected to the brake ECU 70, in addition to the stroke sensor 25 or instead thereof. Examples of the means for detecting an operating state of the brake include, for example, a pedal tread force sensor for detecting operating force of the brake pedal 24, and a brake switch for detecting the fact that the brake pedal 24 has been stepped on, etc.

The brake control system according to the present embodiment, comprising the fluid pressure brake unit 20 formed as stated above, can perform a brake regeneration cooperative control. In response to a braking request, the brake ECU 70 starts the process. The braking request is generated when braking force is to be provided to a vehicle, such as, for example, when a driver operates the brake pedal 24. The brake ECU 70 repeatedly performs the controls at predetermined control cycles, for example, before the operation of the brake pedal 24 is released.

In response to the braking request, the brake ECU 70 calculates a target deceleration, i.e., required braking force. The brake ECU 70 calculates a target deceleration based on, for example, a master cylinder pressure and a measured stroke value. Herein, the brake ECU 70 may calculate the target braking force for each wheel by distributing the target deceleration to each wheel in accordance with desired braking force distribution, and may control, in the subsequent processes, the regenerative braking force and fluid pressure braking force based on the target braking force.

The brake ECU 70 calculates required regenerative braking force based on the target deceleration. For example, when the target deceleration is smaller than the maximum regenerative braking force that can be generated, the brake ECU 70 makes the required regenerative braking force to be equal to the target deceleration, and when the target deceleration is larger than or equal to the maximum regenerative braking force, the brake ECU 70 makes the required regenerative braking force to be equal to the maximum regenerative braking force. Alternatively, the brake ECU 70 may calculate the required regenerative braking force by correcting the target deceleration, not by taking, as the required regenerative braking, the target deceleration as is. The required regenerative braking force may be corrected to be larger than the target deceleration or conversely to be smaller than that. The brake ECU 70 transmits the calculated required regenerative braking force to the hybrid ECU 7. The brake ECU 70 and hybrid ECU 7 are connected to the in-vehicle network. The brake ECU 70 transmits the required regenerative braking force to the in-vehicle network.

The hybrid ECU 7 receives the required regenerative braking force from the in-vehicle network. The hybrid ECU 7 controls the regenerative brake unit 10 by taking the received required regenerative braking force as the regenerative braking force target value. The hybrid ECU 7 transmits the effective value of the regenerative braking force that has been actually generated as a result of the above control to the brake ECU 70 through the in-vehicle network.

The brake ECU 70 receives the effective value of the regenerative braking force from the hybrid ECU 7. The brake ECU 70 calculates the required fluid pressure braking force, which is the braking force to be generated by the fluid pressure brake unit 20, by subtracting the effective value of the regenerative braking force from the target deceleration. The brake ECU 70 calculates the target fluid pressure for each of the wheel cylinders 23FR to 23RL, based on the required fluid pressure braking force. The brake ECU 70 may correct the required fluid pressure braking force or the target fluid pressure. The brake ECU 70 controls the fluid pressure actuator 40 such that the wheel cylinder pressure becomes equal to the target fluid pressure. The brake ECU 70 determines a value of the control current to be supplied to the pressure-increasing linear control valve 66 or the pressure-reducing linear control valve 67 by, for example, a feedback control.

As a result, in the fluid pressure brake unit 20, the brake fluid is supplied from the power fluid pressure source 30 to each wheel cylinder 23 via the pressure-increasing linear control valve 66, thereby allowing braking force to be provided to the wheels. Also, the brake fluid is discharged from each wheel cylinder 23 via the pressure-reducing linear control valve 67, if necessary, thereby allowing the braking force to be provided to the wheels to be regulated. In the present embodiment, the wheel cylinder pressure control system is formed by including the power fluid pressure source 30, the pressure-increasing linear control valve 66, and the pressure-reducing linear control valve 67, etc. A braking force control of a so-called brake-by-wire method is performed by the wheel cylinder pressure control system. The wheel cylinder pressure control system is provided in parallel with the supply channel of the brake fluid from the master cylinder unit 27 to the wheel cylinder 23.

When the braking force control of a brake-by-wire method is performed, the brake ECU 70 prevents the supply of the brake fluid sent out from the first master cylinder 32 to the wheel cylinder 23 by closing the first master cut valve 64. Further, the brake ECU 70 closes the second master cut valve 65 and opens the simulator cut valve 68. This is performed in order to supply, with the operation of the brake pedal 24 by a driver, the brake fluid sent out from the second master cylinder 33 to the stroke simulator 69, not to the wheel cylinder 23. During the brake regeneration cooperative control, a differential pressure corresponding to the magnitude of the regenerative braking force acts between the up and down streams of each of the first master cut valve 64 and the second master cut valve 65.

In the aforementioned brake regeneration cooperative control, the regenerative braking force is preferentially generated and a shortage of the regenerative braking force relative to the required braking force is compensated by friction braking force. However, the present embodiment is not limited to such a regeneration priority mode. For example, a control unit may control the braking force by a regeneration auxiliary mode in which the regenerative braking force is used in an auxiliary manner, or by a regeneration combined mode in which the target deceleration is distributed into a preset regeneration target value and a preset friction target value to generate the regenerative braking force and the friction braking force.

As stated above, the first master channel 61 to be connected to the first master cylinder 32 and the second master channel 62 to be connected to the second master cylinder 33 are formed in the present embodiment. The first master channel 61 and the second master channel 62 form a so-called "X-pipe" in which the first master channel 61 can communicate with the wheel cylinder 23RL for the left rear wheel and the wheel cylinder 23FR for the right front wheel, while the second master channel 62 can communicate with the wheel cylinder 23FL for the left front wheel and the wheel cylinder 23RR for the right rear wheel.

By adopting such an "X-pipe", for example, if a fail, such as fluid leakage, occurs in a channel system including the first master channel 61 or that including the second master channel 62, a fail-safe function can be achieved, in which sufficient braking force can be generated only by one of the two channel systems. For example, if fluid leakage occurs in the channel system including the second master channel 62 and when a braking request is issued by an operation of the brake pedal 24 by a driver, the pressure-increasing linear control valve 66 and the second master cut valve 65 are closed and the first master cut valve 64 is opened. In this case, the brake fluid flowing out from the first master cylinder 32 is supplied to the wheel cylinder 23RL for the left rear wheel and to the wheel cylinder 23FR for the right front wheel. That is, braking force can be generated by one of the front wheels and one of the rear wheels, the one of the rear wheels being positioned diagonally with the one of the front wheels. Similarly, if fluid leakage occurs in the channel system including the first master channel 61, the pressure-increasing linear control valve 66 and the first master cut valve 64 are closed and the second master cut valve 65 is opened. As a result, the brake fluid flowing out from the second master cylinder 33 is supplied to the wheel cylinder 23FL for the left front wheel and to the wheel cylinder 23RR for the right rear wheel. That is, braking force can be generated by one of the front wheels and one of the rear wheels, the one of the rear wheels being positioned diagonally with the one of the front wheels. In this case, a disk brake unit 21 for the front wheel is available even when either of the first master channel 61 and the second master channel 62 is used. That is, when the braking capability of the disk brake unit 21 on the front wheel side is set to be larger than that of the disk brake unit 21 on the rear wheel side in view of the distribution of a vehicle weight, etc., the disk brake unit 21 on the front wheel side, having larger braking capability, is used even when either channel system is used, thereby allowing sufficient braking force to be exerted. In other words, a disk brake unit, having braking capability smaller than that of the disk brake unit 21 on the front wheel side, can be used as the disk brake unit 21 on the rear wheel side, as far as conditions, such as the distribution of a vehicle weight, etc., are satisfied. As a result, it can contribute to a reduction in the cost or size of the disk brake unit 21. Further, an inexpensive disk brake or drum brake, etc., can be used a brake system for the rear wheel, which provides an advantage in terms of cost.

In the present embodiment, the master cylinder portion of the master cylinder unit 27 is isolated into two chambers of the first master cylinder 32 and the second master cylinder 33 such that the brake fluid is supplied to the first master channel 61 and the second master channel 62 in substantially the same fluid pressure states as each other and at substantially the same timings as each other. Accordingly, the braking force occurring when braking is performed only by the channel system including the first master channel 61 and that occurring when braking is performed only by the channel system including the second master channel 62 become substantially the same as each other. Accordingly, it can be suppressed to provide a sense of discomfort with respect to a brake feeling to a driver.

When the aforementioned "X-pipe" is adopted and when a braking force control of a brake-by-wire method in which the brake fluid is supplied from the power fluid pressure source 30 is performed, there is an issue to be considered. That is, the main channel 45 is divided into the first channel 45a and the second channel 45 by providing the isolation valve 60 in the main channel 45 to achieve the "X-pipe". When the brake fluid is supplied from the power fluid pressure source 30, the first channel 45a and the second channel 45b are communicated with each other by opening the isolation valve 60. In the case, the first channel 45a becomes a channel system passing through the isolation valve 60, while the second channel 45b becomes a channel system not passing through the isolation valve 60. Because the isolation valve 60 causes a flow resistance even in an opened state, occurrence of a difference in control time or a pressure difference may be caused by passing through the isolation valve 60. If a difference in control time or a pressure difference occurs between the first channel 45a and the second channel 45b in the "X-pipe", the braking balance of a vehicle is sometimes lost and a decrease in a brake feeling is sometimes induced.

Therefore, it is configured in the present embodiment that, when the brake fluid having passed through the pressure-increasing linear control valve 66, which is a fluid volume control valve, is supplied from the first channel 45a and the second channel 45b to each wheel cylinder 23, a difference in control time or a pressure difference does not occur between the first channel 45a side and the second channel 45b side. Specifically, the orifice 100 that functions as a regulation unit is provided, the regulation unit regulating a state of supplying the brake fluid such that a difference between a state of supplying the brake fluid to the first channel 45a into which the brake fluid flows after passing through the isolation valve 60 and a state of supplying the brake fluid to the second channel 45b into which the brake fluid flows without passing through the isolation valve, is reduced. The state of supplying the brake fluid, which is regulated by the orifice 100 that is the regulation unit, can mean values expressing a state occurring when the brake fluid is supplied, such as, for example, a flow rate or pressure at which the brake fluid is supplied, and a timing of the supply. The flow resistance of the orifice 100 is made substantially the same as that of the isolation valve 60 in an opened state. This regulation can be easily achieved by regulating the cross-area of the orifice 100. Further, the regulation unit is composed of the orifice 100, there is a merit that the channel configuration can be simplified, because it is not needed to confirm an on-off state of the orifice 100, unlike the isolation valve 60, and accordingly it is not needed to provide a pressure sensor for confirming the on-off state. In this case, the pressures in the first channel 45a and the second channel 45b can be managed by the control pressure sensor 73.

Thus, by arranging, in the main channel 45, the orifice 100 that generates the same flow resistance as that of the isolation valve 60 such that the connection position of the accumulator channel 63 is located between the isolation valve 60 and orifice 100, occurrence of a difference in control time or a pressure difference can be suppressed when the brake fluid is supplied from the pressure-increasing linear control valve 66 to the first channel 45a and the second channel 45b. As a result, even when the "X-pipe" is adopted, a decrease in a brake feeling during the normal braking using the power fluid pressure source 30 can be suppressed. Further, even when only the second channel 45b is used by closing the isolation valve 60, braking force using the second master channel 62 can be sufficiently generated because the individual channels 43 and 44 are not affected by the presence of the orifice 100.

In the case of the configuration of the fluid pressure brake unit as illustrated in FIG. 2, the brake fluid is supplied from the pressure-increasing linear control valve 66 to the wheel cylinder 23 when the ABS control is performed. Because holding or reducing the fluid pressure during the ABS control is performed by closing the ABS holding valves 51 to 54, the volume of the upstream from the ABS holding valves becomes a volume till the pressure-increasing linear control valve 66, which is very small. That is, the flowable volume of the brake fluid formed between the pressure-increasing linear control valve 66 and each wheel cylinder 23 becomes very small. If a fluid pressure is controlled by the pressure-increasing linear control valve 66 in a state where a flowable volume is very small, as stated above, control sensitivity becomes very high. As a result, fluid pressure hunting or frequent operations (control hunting) of the pressure-increasing linear control valve 66 is caused, and hence an increase in an operating noise or vibration is induced and a decrease in a brake feeling may be caused due to a response difference of the fluid pressure or a fluid pressure difference. Also, the pressure-increasing linear control valve 66 operates frequently, which may cause the life thereof to be shortened.

Accordingly, operations of the pressure-increasing linear control valve 66 are synchronized with on-off operations of the ABS holding valves 51 to 54 in the present embodiment. For example, when the ABS control is performed, a control gain in the feedback of the pressure-increasing linear control valve 66 is changed in accordance with the number of the closed ABS holding valves, i.e., the number of the ABS holding valves not communicating with the wheel cylinder 23.

FIG. 3 is a table explaining the relationship between the number of the closed ABS holding valves and control gains of the pressure-increasing linear control valve 66. As illustrated in FIG. 3, there are 16 patterns in the combinations of on-off states of the ABS holding valves. When the combinations are sorted out with "control modes" in each of which the volumes between the pressure-increasing linear control valve 66 and the ABS holding valve are assumed to be the same as each other, there are 9 patterns. In FIG. 3, ABS control mode 1 has the smallest flowable volume of the brake fluid and the flowable volume becomes larger toward ABS control mode 9. Accordingly, gains of the pressure-increasing linear control valve 66 are set with respect to the ABS control modes 1 to 9. That is, the control gains are set such that the most insensitive control is performed in the control gain 1 and more sensitive control is performed toward the control gain 9. In addition, because the disk brake unit 21 having larger braking capability than that of the disk brake unit 21 on the rear wheel side is mounted on the front wheel side in the present embodiment, the volume of the wheel cylinder 23 on the front wheel side is larger than that of the wheel cylinder 23 on the rear wheel side. Accordingly, the ABS control modes are set in such a way that a pattern having the larger number of the opened ABS holding valves on the front wheel side has a larger volume.

For example, when the volume between the pressure-increasing linear control valve 66 and the wheel cylinder 23, i.e., the flowable volume of the brake fluid is large by opening all of the ABS holding valves, as in the ABS control mode 9, the flow of the brake fluid becomes slow in comparison with the case where the flowable volume between the pressure-increasing linear control valve 66 and the wheel cylinder 23 is small, as in the ABS control mode 2. Accordingly, a large control gain is applied to sensitively respond to a change in the fluid pressure detected by the control pressure sensor 73, thereby allowing the target fluid pressure value to be reached smoothly. In this case, even if a fluctuation in the fluid pressure is made large by making the control gain of the pressure-increasing linear control valve 66 to be large, the fluctuation can be absorbed by the large flowable volume, and hence fluid pressure hunting or control hunting can be suppressed.

Figure 4:
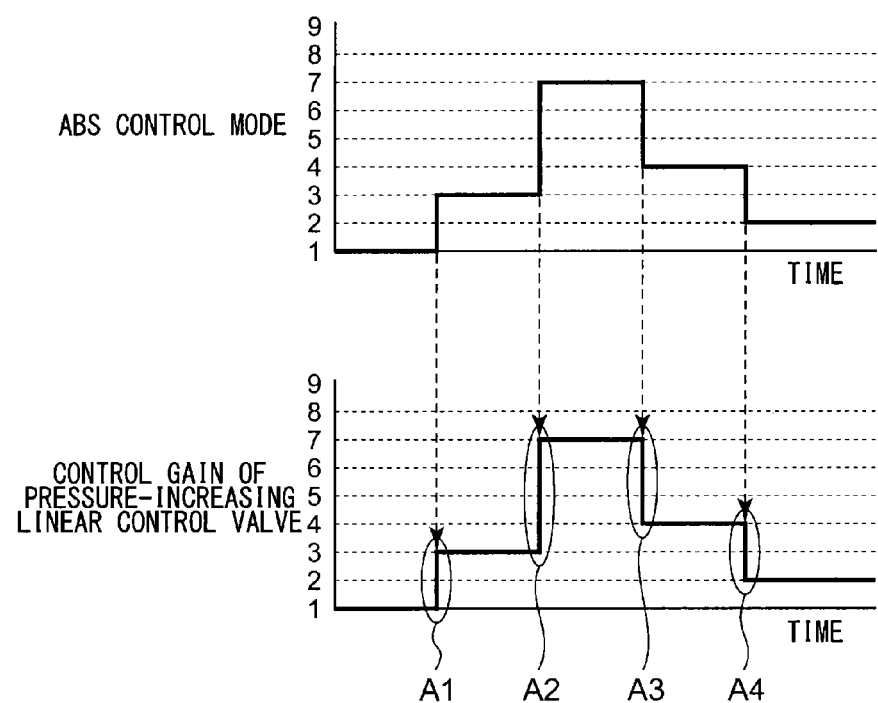
FIG. 4 is graphs explaining an example of synchronization of an ABS control mode with the control gain of the fluid volume control valve in the brake control system according to the embodiment of the invention.

On the other hand, when the flowable volume between the pressure-increasing linear control valve 66 and the wheel cylinder 23 is small, as in the ABS control mode 2, the flow of the brake fluid becomes sensitive in comparison with the ABS control mode 9. Accordingly, a small control gain is applied to insensitively respond to a change in the fluid pressure detected by the control pressure sensor 73. In this case, an excessive fluctuation in the fluid pressure can be suppressed by making the control gain of the pressure-increasing linear control valve 66 to be small, and hence fluid pressure hunting or control hunting can be suppressed. FIG. 4 illustrates that the control gain of the pressure-increasing linear control valve 66 is changed in correspondence with a change in the ABS control mode.

In another embodiment, a small dedicated control gain may be applied when some of the ABS holding valves are closed, irrespective of the number of the opened or closed ABS holding valves. It is desirable to acquire, in advance from experiments, etc., the correspondence relationship between the number of the ABS holding valves whose on-off states have been switched and a change in the flow pressure occurring at the time, and to determine an optimal control gain such that occurrence of a vibration or an abnormal noise resulting from a fluctuation in the flow pressure can be suppressed.

When the control gain of the pressure-increasing linear control valve 66 is changed in correspondence with a change in the ABS control mode, the changed control gain may be validated immediately after the change of the control gain to initiate the control of the pressure-increasing linear control valve 66. In this case, the change of the control gain can be sensitively reflected on the pressure-increasing linear control valve 66. In another embodiment, the changed control gain may be validated when a predetermined period of time has passed after the change of the control gain, without changing a control state of the pressure-increasing linear control valve 66 within the predetermined period of time. As stated above, when the flowable volume of the brake fluid is small, a fluctuation in the fluid pressure of the brake fluid in the channel, occurring with on-off operations of the ABS holding valves, becomes large, which causes an unnecessary up-down fluctuation in the fluid pressure in the transitional period. If the pressure-increasing linear control valve 66 is controlled following the temporal change in the fluid pressure, the control becomes too excessive, which causes a vibration or an abnormal noise. In addition, a further fluctuation in the fluid pressure or a delay in the convergence of the fluctuation is sometimes induced. Accordingly, the control state of the pressure-increasing linear control valve 66 is not changed for a predetermined period of time after changing the control gain in accordance with the on-off states of the ABS holding valves, so that a feedback control of the pressure-increasing linear control valve 66, in correspondence with a fluctuation in the fluid pressure in the transitional period, is temporarily suspended. For example, at each of A1 to A4 in FIG. 4 where a control gain is changed, validation of the changed control gain is delayed by, for example, several msec. After a fluctuation in the fluid pressure of the brake fluid in the channel, occurring with on-off operations of the ABS holding valves, has been stabilized, the changed control gain is validated to control the pressure-increasing linear control valve 66. As a result, it becomes possible to follow a fluctuation in the fluid pressure, occurring with on-off operations of the ABS holding valves, by the small number of times of control of the pressure-increasing linear control valve 66. That is, an efficiency at which fluid pressure hunting or control hunting is suppressed can be increased. Alternatively, a change in the control gain may be itself delayed by a predetermined period of time in order not to change the control state of the pressure-increasing linear control valve 66 within the predetermined period of time. Thus, by delaying a change in the control state based on a control gain by a predetermined period of time, there is a merit that a fluctuation in the fluid pressure can be dealt with fewer types of control gains in comparison with the case of not being delayed. Alternatively, the pressure-increasing linear control valve 66 may be controlled when a fluctuation in the fluid pressure of the brake fluid in the channel, occurring with on-off operations of the ABS holding valves, is stabilized after a predetermined period of time has elapsed from the on-off operations thereof, without changing a control gain. Also, in this case, excessive control of the pressure-increasing linear control valve 66 can be suppressed, and hence there is an advantage that fluid pressure hunting or control hunting can be suppressed.

In a fluid pressure brake unit including the orifice 100, as illustrated in FIG. 2, if an opening failure occurs in which the pressure-increasing linear control valve 66 is fixed in an opened state, the accumulator pressure is decreased. That is, if an opening failure occurs in the pressure-increasing linear control valve 66, the brake fluid supplied from the accumulator 35 is provided to the channel between the isolation valve 60 and the orifice 100 via the accumulator channel 63. Even if the isolation valve 60 is closed at the time, the brake fluid flows toward the orifice 100. Because the second master cut valve 65 is usually opened, the brake fluid supplied from the accumulator 35 returns to the reservoir 34 via the second master cylinder 33, thereby causing the accumulator pressure of the accumulator 35 to be decreased accordingly.

When the accumulator pressure is decreased as stated above, a braking force control in which the power fluid pressure source 30 serves as a fluid pressure source cannot be expected. Accordingly, the brake ECU 70 will shift to backup control in which the master cylinder unit 27 serves as a fluid pressure source. At the time, because an opening failure occurs in the pressure-increasing linear control valve 66, the brake fluid supplied from the second master cylinder 33 flows back through the pressure-increasing linear control valve 66 to return to the reservoir 34. Accordingly, braking force is not generated in the wheel cylinders 23FL and 23RR for the left front wheel and right rear wheel, respectively. That is, braking is performed only by the wheel cylinders 23RL and 23FR for the left rear wheel and right front wheel, respectively, the both wheel cylinders being operating by the brake fluid sent out from the first master cylinder 32. In addition, because the accumulator pressure is not supplied and support for the tread force by the fluid pressure booster 31a cannot be acquired in this case, the fluid pressure generated only by the tread force of a driver is introduced into the wheel cylinder 23, thereby causing the work of the driver to be increased.

In a general power fluid pressure source comprising an accumulator, it is configured to increase a accumulator pressure to a predetermined target pressure by continuously operating a pump when the accumulator pressure is decreased. This control mode is referred to as a normal pump control mode. If a pump is continuously driven such that a period of time when the motor is driven exceeds a preset period of time under the normal pump control mode execution, it is designed that the pump is to be intermittently driven to prevent a malfunction due to excessive heat generation in the pump and burnout of the motor. Such a control mode is referred to as an intermittent pump control mode. Although a control logic for protection purpose, such as the intermittent pump control mode, is important, it is configured in the present embodiment that an improvement in a brake feeling is prioritized, and accordingly when the pump is stopped while the accumulator pressure is being decreased, the pump is exceptionally operated upon detecting an operation of the brake pedal 24.

That is, when the pump is stopped while the accumulator pressure is being decreased in the intermittent pump control mode, the brake ECU 70 operates the pump 36 by driving the motor 36a upon detecting stepping-on of the brake pedal 24 by the stroke sensor 25. In this case, the charged pressure in the accumulator 35 on the upstream side of the pressure-increasing linear control valve 66 is instantly increased. When the accumulator pressure is recovered, the accumulator pressure can be supplied to the fluid pressure booster 31a and the support for the tread force on the brake pedal 24 becomes possible, thereby allowing the operation work of a driver to be reduced. Further, the accumulator pressure accumulated in the accumulator 35 can also be supplied to the wheel cylinders 23FL and 23RR for the left front wheel and right rear wheel, respectively, via the opened pressure-increasing linear control valve 66. That is, because the output ports of the first master cylinder 32 and the second master cylinder 33 are closed by operating the brake pedal 24, the brake fluid supplied to the wheel cylinders 23FL and 23RR for the left front wheel and right rear wheel, respectively, does not return to the reservoir 34. Accordingly, the wheel cylinder 23FL and 23RR for the left front wheel and right rear wheel, respectively, can generate braking force by the accumulator pressure.

Figure 5:
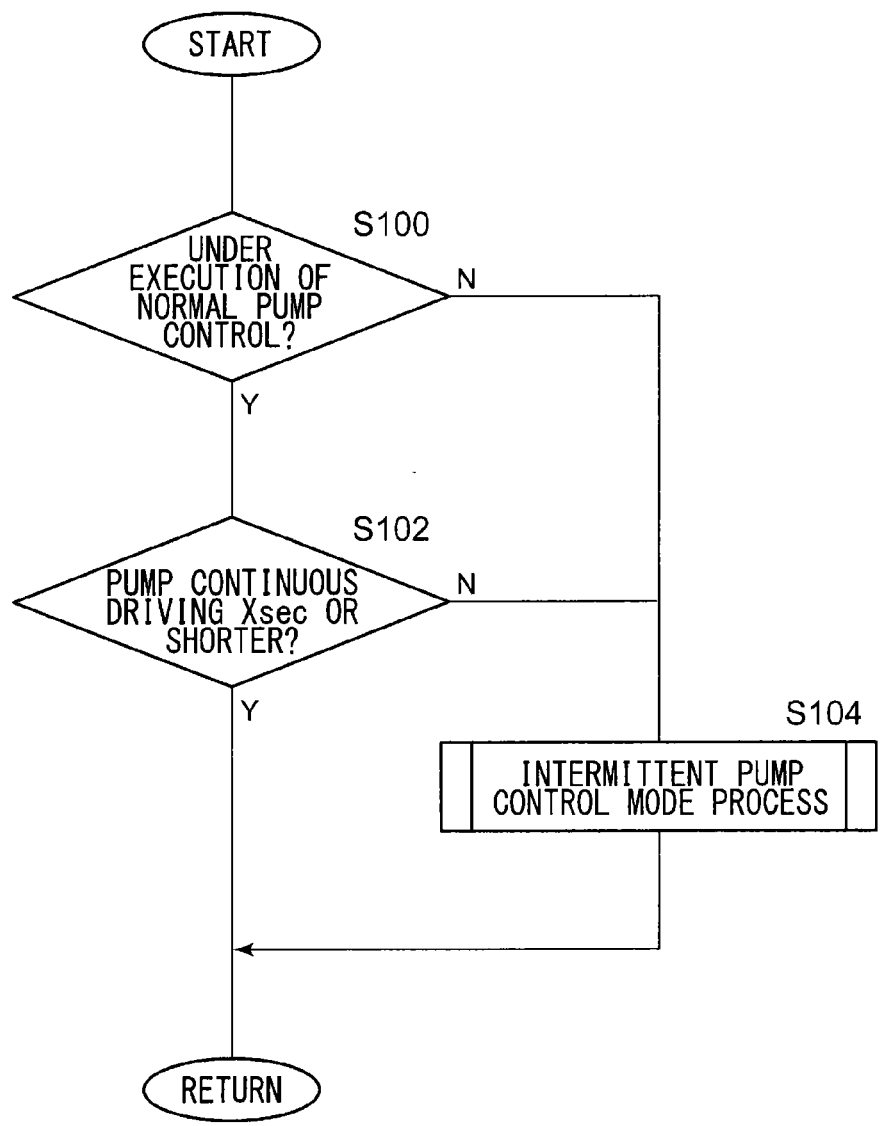
FIG. 5 is a flowchart explaining control states of a pump for performing a pressure accumulation control of a power fluid pressure source in the brake control system according to the embodiment of the invention.

FIG. 5 is a flowchart explaining control states of the pump 36. Description will be made, assuming that the brake ECU 70 is in the normal pump control mode in an initial state where an ignition switch, etc., of a vehicle is in an on-state. The brake ECU 70 confirms whether the control state of the pump 36 is under the normal pump control execution (S100). In S100, when the control state of the pump 36 is under the normal pump control execution (S100/Y), i.e., when the accumulator pressure becomes lower than or equal to a predetermined target pressure, the accumulator pressure is increased to the target pressure by driving the pump 36 with the use of the motor 36a. At the time, the brake ECU 70 confirms whether the period of time when the pump is continuously driven is shorter than or equal to "X sec" (S102). The "X sec" can be determined, in advance from tests, etc., by the capability of the motor 36a or the pump 36, and is set to a value in which burnout or heat generation resulting from continuous driving does not matter. In S102, when the period of time when the pump 36 is continuously driven is shorter than or equal to the X sec (S102/Y), the normal pump control can be continuously executed, and the step shifts to S100 to repeat the process of the flow. On the other hand, when the period of time when the pump 36 is continuously driven exceeds the X sec in a state where the accumulator pressure does not reach the target pressure (S102/N), or when the normal pump control mode is not being executed in S100 (S100/N), the brake ECU 70 executes the intermittent pump control mode process (S104). Thereafter, the step shifts to S100 to repeat this flow. The intermittent pump control mode process is executed in the case where accumulation of pressure takes longer time than usual, such as, for example, when the aforementioned failure in the pressure-increasing linear control valve 66 or fluid leakage in the channel systems occurs, or when the accumulator pressure is drastically decreased by frequent braking requests even if the systems are in normal states.

Figure 6:
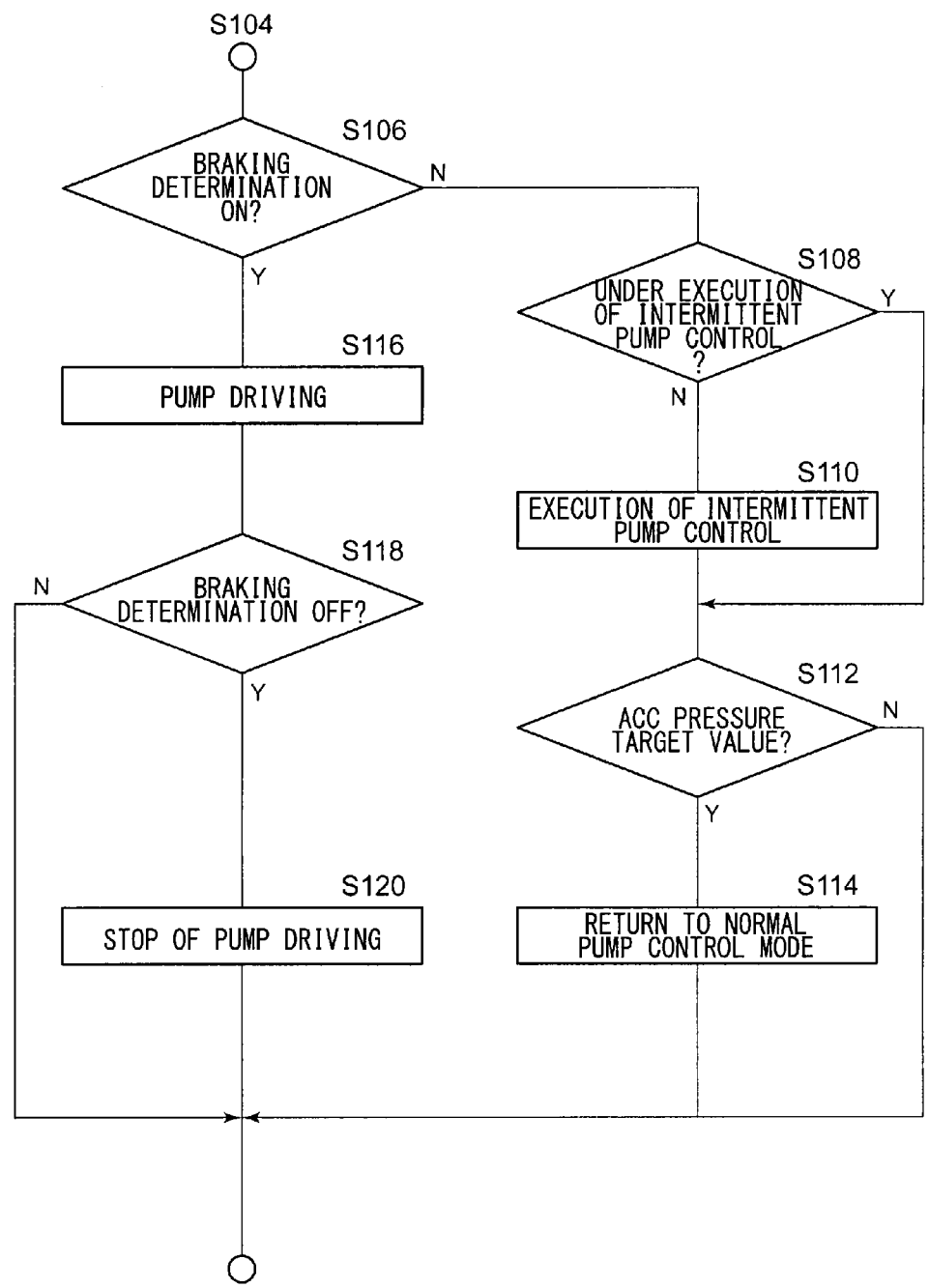
FIG. 6 is a flowchart explaining details of an intermittent pump control mode process in S104 of FIG. 5.

FIG. 6 is a flowchart explaining details of the intermittent pump control mode process in FIG. 5. While the intermittent pump control mode process is being executed, the brake ECU 70 monitors whether braking determination is performed based on a signal from the stroke sensor 25 (S106). When the braking determination is not in an ON-state (S106/N), the intermittent pump control is executed (S110) while such the control is not being executed (S108/N). That is, when the period of time when the pump 36 is continuously driven reaches the X sec, control is executed in which the driving of the pump 36 is stopped for a predetermined period of time, e.g., for Y sec. Thereafter, control is executed in which the pump 36 is again driven for a period of time shorter than or equal to the X sec, and when the X sec has elapsed, a stop is repeated for a period of time shorter than or equal to the Y sec. In S108, when the intermittent pump control is already executed (S108/Y), the process in S110 is skipped. When the accumulator pressure has reached the target pressure during the intermittent pump control (S112/Y), the brake ECU 70 makes the control mode return to the normal pump control mode (S114) to end the flow. When the accumulator pressure does not reach the target pressure in S112 (S112/N), the process in S114 is skipped to continue the process of the intermittent pump control mode.

In S106, when the braking determination is an ON-state (S106/Y), the brake ECU 70 increases the accumulator pressure by exceptionally driving the pump 36 even if the intermittent pump control is being executed (S116). When the braking determination shifts to an OFF-state (S118/Y), the brake ECU 70 stops the driving of the pump 36 that has been exceptionally operated (S120), and ends this flow to continue the intermittent pump control. In addition, in S118, when the braking determination is still in an ON-state (S118/N), the brake ECU 70 skips the process in S120 and continues the exceptional continuous driving of the pump 36 to end this flow.

As stated above, even if a fail occurs in the pressure-increasing linear control valve 66 in a brake control system including intermittent pump control of the pump 36 and comprising the orifice 100 as a regulation unit, a good brake feeling can be obtained by providing an exceptional mode in the intermittent pump control.

Figure 7:
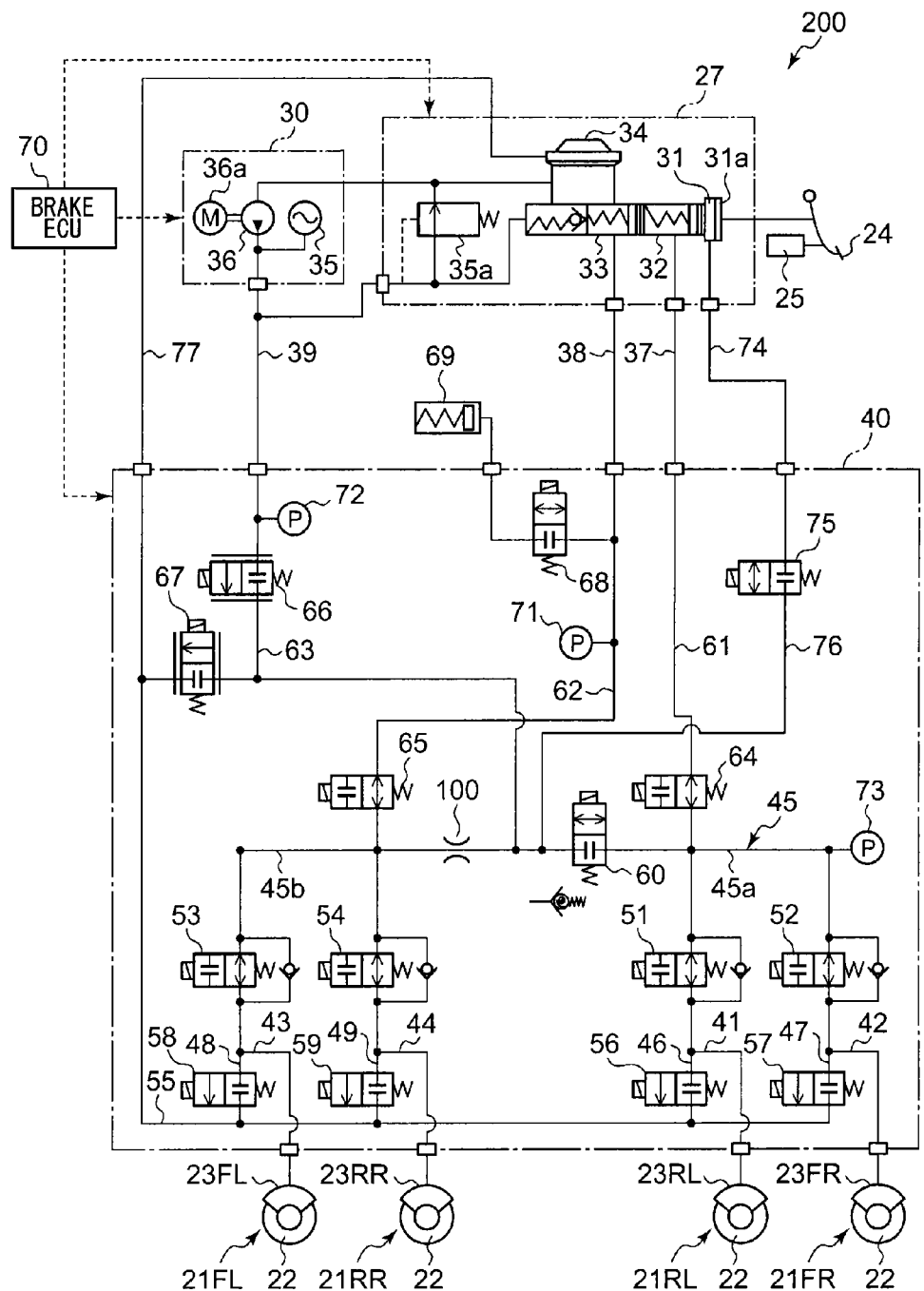
FIG. 7 is a system view illustrating a fluid pressure brake unit according to another embodiment of the invention.

FIG. 7 is a system view illustrating a fluid pressure brake unit according to another embodiment. In the fluid pressure brake unit 200 illustrated in FIG. 7, the regulator pipe 74 extending from the regulator 31 is connected to the fluid pressure actuator 40, and the regulator channel 76 having the regulator cut valve 75 in the middle thereof is connected between the isolation valve 60 and the orifice 100 in the second channel 45b. Other than this point, the configuration of the fluid pressure brake unit 20 illustrated in FIG. 2 and that of the fluid pressure brake unit 200 are substantially the same as each other. Accordingly, members having the same function will be denoted with the same reference numerals and description thereof will be omitted.

As described in FIGS. 3 and 4, when the ABS control is performed in the fluid pressure brake unit 20, the brake fluid is supplied from the pressure-increasing linear control valve 66 to the wheel cylinder 23. In this case, because holding or reducing the fluid pressure during the ABS control is performed by closing the ABS holding valves 51 to 54, the volume of the upstream from the ABS holding valves becomes a volume till the pressure-increasing linear control valve 66, and the flowable volume of the brake fluid becomes very small. As a result, control hunting is caused during the ABS control, thereby causing an increase in an operating noise or vibration. In addition, a decrease in a brake feeling is caused. Accordingly, in the fluid pressure brake fluid 200, it is configured that, when the ABS control is executed, a regulated regulator pressure is supplied directly from the regulator 31 by closing the pressure-increasing linear control valve 66 such that the supply of the brake fluid passing through the pressure-increasing linear control valve 66 is switched to the supply thereof passing through the regulator 31.

The regulator cut valve 75 has a solenoid on which an ON-OFF control is performed and s spring, and is a normally-closed electromagnetic control valve that is closed when the solenoid is not powered, an opened state of the regulator cut valve 75 being ensured by the electromagnetic force generated by the solenoid when receiving a supply of a specified control current. The flow of the brake fluid between the regulator 31 and the second channel 45b of the main channel 45 is blocked by the closed regulator cut valve 75. When the regulator cut valve 75 is opened by the solenoid being powered, the brake fluid can be distributed bidirectionally between the regulator 31 and the second channel 45b of the main channel 45. The regulator 31 reduces the accumulator pressure of the accumulator 35 to a fluid pressure in accordance with the tread force on the brake pedal 24. Accordingly, the stabilized regulator pressure can be provided to each wheel cylinder 23, and the brake fluid is blocked by the regulator cut valve 75 or passes through the valve 75, and hence control hunting does not occur, which has been needed to be taken into consideration during the ABS control in the fluid pressure brake unit 20. Accordingly, occurrence of an operating noise or vibration, occurring during the ABS control, can be easily suppressed.

Further, in the case of the fluid pressure brake unit 200, a pressure-increasing linear control valve 66 whose durability performance is reduced in comparison with that in the fluid pressure brake unit 20 can be used because the control valve 66 is closed and not operated, thereby contributing to a reduction in cost. Further, because the pressure-increasing linear control valve 66 is not used during the ABS control, the number of control times can be reduced, thereby contributing to a reduction in a control noise or vibration and to extension of a life. Further, even when the brake fluid is supplied from the regulator 31 during the ABS control, a response difference of the fluid pressure or a fluid pressure difference does not occur between the first channel 45a and the second channel 45b, because the orifice 100 is present in the main channel 45, the orifice 100 generating the similar flow resistance as that of the isolation valve 60. As a result, a decrease in a brake feeling can be suppressed.

In addition, when a brake control by a usual brake-by-wire method is performed, other than the ABS control, the regulator cut valve 75 is closed such that the control can be performed by the channel passing through the pressure-increasing linear control valve 66, in the same way as in the fluid pressure brake unit 20.

Figure 8:
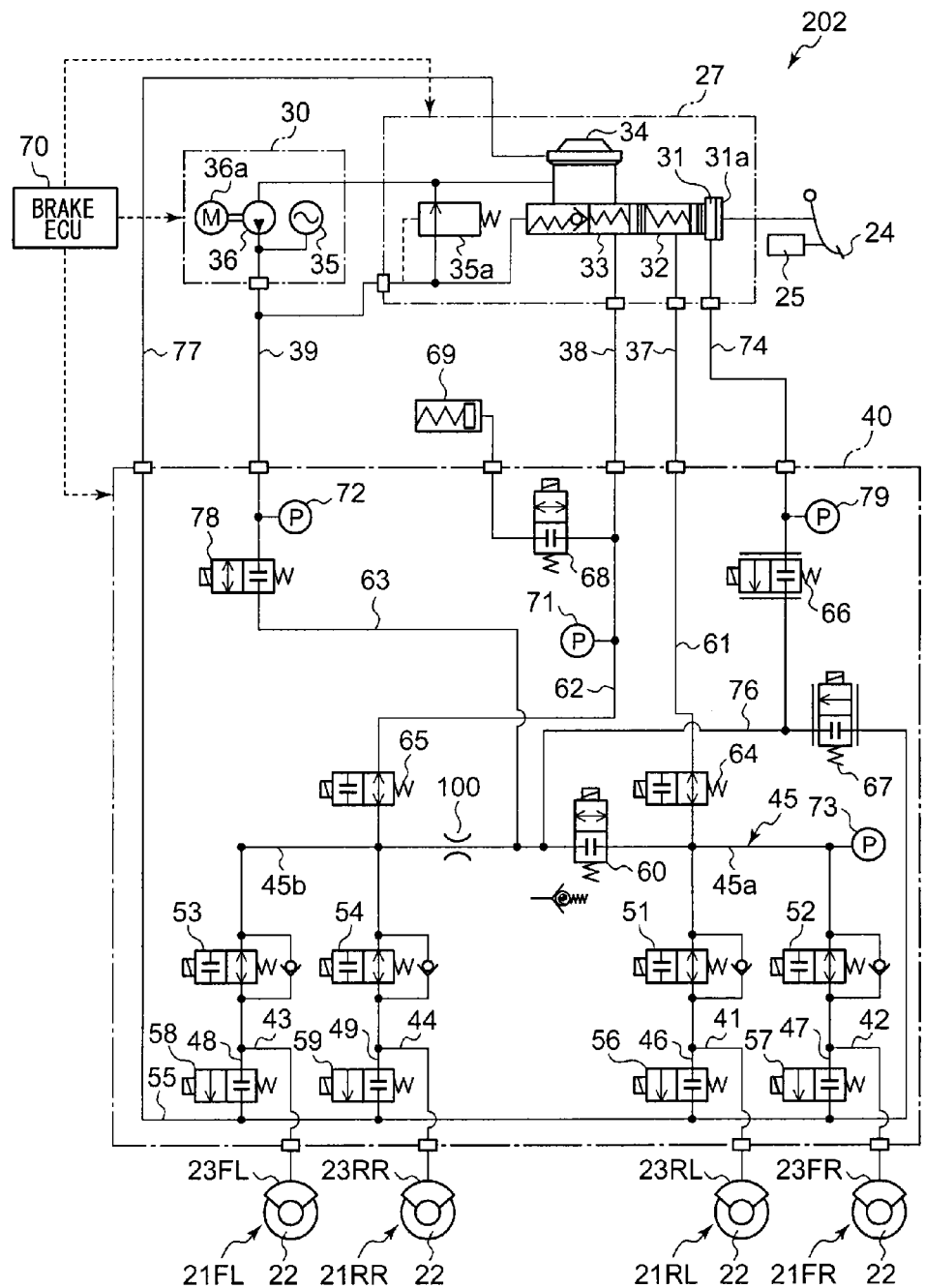
FIG. 8 is a system view illustrating a fluid pressure brake unit according to another embodiment of the invention.

FIG. 8 is a system view illustrating a fluid pressure brake unit according to another embodiment. In the fluid pressure brake unit 202 illustrated in FIG. 8, the regulator pipe 74 extending from the regulator 31 is connected to the fluid pressure actuator 40, and the regulator channel 76 having the pressure-increasing linear control valve 66 in the middle thereof is connected between the isolation valve 60 and the orifice 100 in the second channel 45b. In addition, the accumulator cut valve 78 by which the accumulator channel 63 is blocked in the middle thereof is provided in the accumulator channel 63 that is connected between the isolation valve 60 and the orifice 100 in the second channel 45b. The pressure-reducing linear control valve 67 provided in the regulator channel 76 connected to the second channel 45b is connected to the reservoir channel 55. Other than these points, the configuration of the fluid pressure brake unit 20 illustrated in FIG. 2 and that of the fluid pressure brake unit 202 are substantially the same as each other. Accordingly, members having the same function will be denoted with the same reference numerals and description thereof will be omitted.

In the same way as the pressure-increasing linear control valve 66 and the pressure-reducing linear control valve 67 in the fluid pressure brake unit 20, each of the two components in the pressure-increasing linear control valve 202 has a linear solenoid and a spring, each of which is a normally-closed electromagnetic control valve that is closed when the solenoid is not powered. The valve opening angle of each of the pressure-increasing linear control valve 66 and the pressure-reducing linear control valve 67 is regulated to be proportionate to a current supplied to each solenoid. The regulator pressure sensor 79 detects the pressure of the brake fluid in the regulator channel 76, i.e., the regulator pressure, on the upstream side from the pressure-increasing linear control valve 66, to provide the detected value to the brake ECU 70.

The pressure-increasing linear control valve 66 is provided as a pressure-increasing control valve common for each of the wheel cylinders 23 provided in correspondence with the respective wheels. The pressure-reducing linear control valve 67 is also provided as a pressure-reducing control valve common for each of the wheel cylinders 23. That is, in the fluid pressure brake unit 202, the pressure-increasing linear control valve 66 and the pressure-reducing linear control valve 67 are provided as a pair of common valves that supply/discharge the brake fluid sent out from the regulator 31 to/from each wheel cylinder 23. It is desirable in terms of cost to make the pressure-increasing linear control valve 66 and the pressure-reducing linear control valve 67 to be common for each wheel cylinder 23, in comparison with the case where a linear control valve is provided for each wheel cylinder 23.

The accumulator cut valve 78 has a solenoid on which an ON-OFF control is performed and a spring, and is a normally-closed electromagnetic control valve that is closed when the solenoid is not powered, an opened state of the accumulator cut valve 78 being ensured by the electromagnetic force generated by the solenoid when receiving a supply of a specified control current. The flow of the brake fluid between the accumulator 35 and the second channel 45b of the main channel 45 is blocked by the closed accumulator cut valve 78. When the accumulator cut valve 78 is opened by the solenoid being powered, the brake fluid can be distributed bidirectionally between the accumulator 35 and the second channel 45b of the main channel 45.

In the fluid pressure brake unit 202, particular controls, such as braking force control during a traction control and braking force control during a vehicle stability control system operation that prevents sideslip, both of which are performed when the brake pedal 24 is not operated, are controlled by the accumulator pressure supplied from the accumulator 35 via the accumulator cut valve 78. On the other hand, brake controls performed by operating the brake pedal 24, other than the above particular controls, are controlled by the regulator pressure supplied via the pressure-increasing linear control valve 66 and the pressure-reducing linear control valve 67. That is, when braking force control is performed by a linear control using the pressure-increasing linear control valve 66 and the pressure-reducing linear control valve 67, the supply of the brake fluid from the accumulator 35 is blocked by the accumulator cut valve 78.

In this case, a regulator pressure, which has been regulated to be lower by the regulator 32 based on an operation of the brake pedal 24 by a driver, is supplied to the pressure-increasing linear control valve 66 and the pressure-reducing linear control valve 67. Accordingly, a control valve, the durability performance of which is reduced in comparison with a control valve to which a high accumulator pressure is supplied, such as the pressure-increasing linear control valve 66 and the pressure-reducing linear control valve 67 in the fluid pressure brake unit 20, can be used. Further, because the control pressure is far lower than the accumulator pressure, the controllability of each of the pressure-increasing linear control valve 66 and the pressure-reducing linear control valve 67 can be improved, and the load imposed thereon becomes small, which can contribute to extension of the life. Furthermore, because the regulator pressure regulated in accordance with an operation amount of the brake pedal 24 is lower than the accumulator pressure, there is a merit that the operating noise or vibration in the pressure-increasing linear control valve 66 can be reduced.

When an ABS control is performed in the configuration of the fluid pressure brake unit 202, a regulator pressure can be provided in accordance with an operation amount of the brake pedal 24, and hence the pressure-increasing linear control valve 66 can be fully opened. As a result, there are merits that: the control of the pressure-increasing linear control valve 66 during the ABS control becomes very easy; and the number of control times can be reduced in comparison with the configuration of the fluid pressure brake unit 20 in which the pressure-increasing linear control valve 66 is needed to be finely controlled. These points also contribute to a reduction in the durability performance and to extension of the life.

When a traction control or a vehicle stability control system is performed, a necessary fluid pressure is supplied by the controls of the ABS holding valves 51 to 54 and ABS pressure-reducing valves 56 to 59 with the accumulator cut valve 78 being opened.

Figure 9:
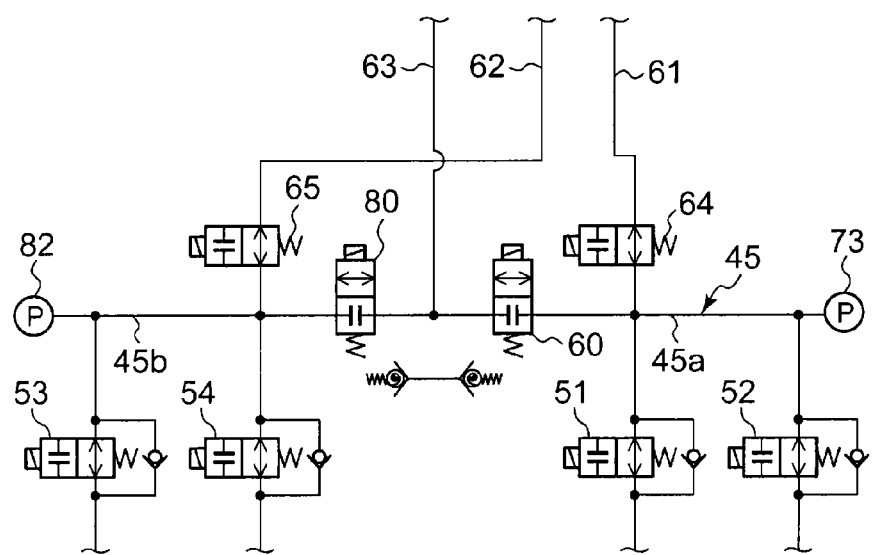
FIG. 9 is a partial system view illustrating a variation of a regulation unit included in the fluid pressure brake unit according to the another embodiment of the invention.

FIG. 9 illustrates a variation of the regulation unit in each of the aforementioned embodiments. FIG. 9 is a partially enlarged view in which only the periphery of the regulation unit in FIG. 2 is enlarged as an example. In FIG. 9, a regulating valve 80, which is a normally-closed electromagnetic control valve substantially the same as the isolation valve 60, is adopted as a regulation unit, instead of an orifice. The regulating valve 80 has a solenoid on which an ON-OFF control is performed and a spring, and is closed when the solenoid is not powered. When the regulating valve 80 is in a closed state, the flow of the brake fluid to the second channel 45b is blocked. When the regulating valve 80 is opened by the solenoid being powered, the brake fluid can be distributed bidirectionally between the first channel 45a and the second channel 45b. In the same way as the relationship between the isolation valve 60 and the orifice 100, a control valve is adopted as the regulating valve 80, the control valve having the same flow resistance as that of the isolation valve 60, preferably having the same model number as that of the isolation valve 60. As a result, when the brake fluid is supplied from the pressure-increasing linear control valve 66, occurrence of a difference in control time or a pressure difference can be suppressed, in the same way as in the case of using the orifice 100. As a result, even when the "X-pipe" is adopted, a decrease in a brake feeling during the normal braking using the power fluid pressure source 30 can be suppressed. Further, because control valves having the same model number as each other can be used as the regulating valve 80 and the isolation valve 60, selection of parts for the regulation unit can be easily performed. When the regulating valve 80 is used, it is desirable to provide, for example, a control pressure sensor in order to confirm on-off of the regulating valve 80.

By using the regulating valve 80 instead of the orifice 100, it can be prevented by closing the regulating valve 80 that, if an opening failure occurs in the pressure-increasing linear control valve 66, the brake fluid may flow back into the reservoir 34. Accordingly, a drastic decrease in the accumulator pressure can be suppressed.

The control described in FIG. 3, in which the number of the closed ABS holding valves are synchronized with the control gain of the pressure-increasing linear control valve, or the control described in FIG. 4, in which a process of delaying the validation of the control gain of the pressure-increasing linear control valve, can also be applied to the case of a so-called "front-rear pipe" in which two system channels sent out from the master cylinder unit 27 are connected to the right and left on the front wheel side and to the right and left on the rear wheel side, respectively. Even when the controls described with reference to FIGS. 3 and 4 are applied to a "front-rear pipe", fluid pressure hunting and control hunting can be suppressed in the same way as in the case of being applied to the "X-pipe".

The channel system described in FIG. 7 using the regulator 31 and the regulator cut valve 75, which are used in an ABS control, can also be applied to the case where the fluid pressure brake unit 200 has a "front-rear pipe" configuration. In this case, a decrease in a brake feeling and occurrence of an operating noise or vibration resulting from a response difference of the fluid pressure or a fluid difference can be easily suppressed, in the same way as in the case of being applied to the "X-pipe".

Similarly, the configuration described in FIG. 8, in which the brake fluid from the regulator 31 is supplied to each wheel cylinder 23 via the pressure-increasing linear control valve 66, can also be applied to the case where the fluid pressure brake unit 202 has a "front-rear pipe" configuration. In this case, a linear control valve whose durability performance has been reduced can be used, and improvement in controllability and a reduction in an operating noise or vibration can be achieved.

Each of FIGS. 2, 7, and 8 illustrates an example of a brake system having disk brakes for four wheels; however, for example, the brake systems on the rear wheel side may be drum brakes, or the brake systems for four wheels may be drum brakes. Also, in this case, the advantages the same as the aforementioned each embodiment can be obtained, and a reduction in cost can be easily achieved by using a drum brake. In the present embodiments, a brake control system including a brake regeneration cooperative control has been described as an example; however, the present invention can also be applied to a system of a brake-by-wire method, not including a brake regeneration cooperative control, and in the case the same advantages can be obtained.

The present invention should not be limited to the aforementioned embodiments, and various variations such as design modifications or the like may be made thereto based on knowledge of a person skilled in the art. The configuration illustrated in each view is intended to exemplify an example, and the configuration can be appropriately modified to a configuration having a similar function, which can provide similar effects.

INDUSTRIAL APPLICABILITY

According to the present invention, sufficient braking force can be exerted without a decrease in braking feeling, when a power fluid pressure source and a manual fluid pressure source are provided and even when a brake system on the rear wheel side and that on the front wheel side, one having braking capability different from the other, are mounted for a reduction in cost or size.

The invention claimed is:

1. A brake control system comprising:
    a manual fluid pressure source configured to increase the pressure of a contained operating fluid in accordance with an amount of a brake operation by a driver;
    a power fluid pressure source in which pressure accumulation by the operating fluid is possible with the use of power independent of a brake operation by a driver;
    a fluid volume control valve configured to control a fluid volume of the operating fluid to be supplied from the power fluid pressure source toward a wheel cylinder for each wheel;
    an isolation valve capable of isolating fluid communication into both a first channel through which the operating fluid from the manual fluid pressure source can be supplied to a wheel cylinder for the left front wheel and that for the right rear wheel, and a second channel through which the operating fluid from the manual fluid pressure source can be supplied to a wheel cylinder for the right front wheel and that for the left rear wheel; and
    a regulation unit positioned in a channel between the first channel and the second channel and configured to regulate, when the operating fluid having passed through the fluid volume control valve is supplied from the first channel and the second channel to each wheel cylinder, a state of supplying the operating fluid and reduce a difference between a state of supplying operating fluid to one of the first channel and the second channel by passing through the isolation valve, and a state of supplying the operating fluid to the other of the first channel and the second channel without passing through the isolation valve.

2. The brake control system according to claim 1 further comprising:
    an on-off valve provided for each wheel cylinder to determine whether the operating fluid is supplied to a respective wheel cylinder; and
    a valve controller configured to control on-off states of the fluid volume control valve and the on-off for each wheel cylinder, wherein
    when switching an on-off state of a respective on-off valve, the valve controller does not change a control state of the fluid volume control valve for a predetermined period of time.

3. The brake control system according to claim 1 further comprising:
    an on-off valve provided for each wheel cylinder to determine whether the operating fluid is supplied to a respective wheel cylinder; and
    a valve controller configured to control on-off states of the fluid volume control valve and the on-off valve of each wheel cylinder, wherein
    when individually controlling each on-off valve and when supplying the operating fluid having passed through the fluid volume control valve toward each wheel cylinder and when switching an on-off state of at least one on-off valve, the valve controller controls the fluid volume control valve by a control gain in correspondence with a number of on-off valves that are simultaneously switched.

4. The brake control system according to claim 3, wherein when switching the on-off state of the at least one on-off valve, the valve controller does not change a control state of the fluid volume control valve for a predetermined period of time.

5. The brake control system according to claim 1, wherein the regulation unit is composed of an orifice.

* * * * *